(12) United States Patent
Repin

(10) Patent No.: US 7,671,867 B2
(45) Date of Patent: Mar. 2, 2010

(54) METHOD FOR LOCATING UNDERGROUND DEPOSITS OF HYDROCARBON INCLUDING A METHOD FOR HIGHLIGHTING AN OBJECT IN A THREE DIMENSIONAL SCENE

(75) Inventor: Dmitriy Repin, Katy, TX (US)

(73) Assignee: Schlumberger Technology Corporation, Houston, TX (US)

( * ) Notice: Subject to any disclaimer, the term of this patent is extended or adjusted under 35 U.S.C. 154(b) by 652 days.

(21) Appl. No.: 11/515,586

(22) Filed: Sep. 5, 2006

(65) Prior Publication Data
US 2007/0257912 A1 Nov. 8, 2007

Related U.S. Application Data

(60) Provisional application No. 60/798,610, filed on May 8, 2006.

(51) Int. Cl.
G06T 15/00 (2006.01)
(52) U.S. Cl. ......................... 345/581; 345/419
(58) Field of Classification Search ................ 345/419, 345/422, 581, 582; 702/5, 11, 12, 16
See application file for complete search history.

(56) References Cited

U.S. PATENT DOCUMENTS

| | | | |
|---|---|---|---|
| 6,304,266 B1 | 10/2001 | Li | |
| 6,654,691 B2 * | 11/2003 | Metrick | ............... 702/6 |
| 6,940,507 B2 | 9/2005 | Repin | |
| 7,003,400 B2 * | 2/2006 | Bryant | ............... 702/5 |
| 2003/0154029 A1 | 8/2003 | Metrick | |
| 2003/0160788 A1 | 8/2003 | Buehler | |
| 2005/0090988 A1 | 4/2005 | Bryant | |

FOREIGN PATENT DOCUMENTS

| | | |
|---|---|---|
| EP | 1033682 | 9/2000 |
| EP | 1262919 | 12/2002 |

OTHER PUBLICATIONS

Castanie, et al., "VolumeExplorer: roaming large volumes to couple visualization and data processing for oil and gas exploration" IEEE Visualization 2005 (IEEE Cat. No. 05CH37721) IEEE Piscataway, NJ, USA, 2005, p. 247-254.
Garbow, et al., "Remote visualization and cluster analysis of 3-D geophysical data over the internet using off-screen rendering" Jun. 2003, p. 1-18.
Mitchell, et al., "Real-time image-space outlining from non-photorealistic rendering" International Conference on Computer Graphics and Interactive Techniques ACM SIGGRAPH 2002, p. 239-239.
Takafumi, et al., "Comprehensible Rendering of 3-D Shapes", Computer Graphics, ACM, US, vol. 24, No. 4, Aug. 1, 1990, p. 197-2206.
Kowalski, et al., "Art-based rendering of fur grass and trees", Proceedings of the 26th Annual Conference on Computer Graphics and Interactive Techniques, 1999, p. 433-438.

* cited by examiner

*Primary Examiner*—Phu K Nguyen
(74) *Attorney, Agent, or Firm*—Robert P. Lord; Jim Patterson; Bryan P. Galloway

(57) ABSTRACT

A method of highlighting a selected object in a 3D scene comprises: executing an off screen rendering software and, responsive thereto, generating a texture image containing an image of the visible parts of a selected object over a background color, and, in response to said texture image, executing an on screen rendering software in combination with a fragment shader software thereby drawing a silhouette of the selected object.

18 Claims, 26 Drawing Sheets

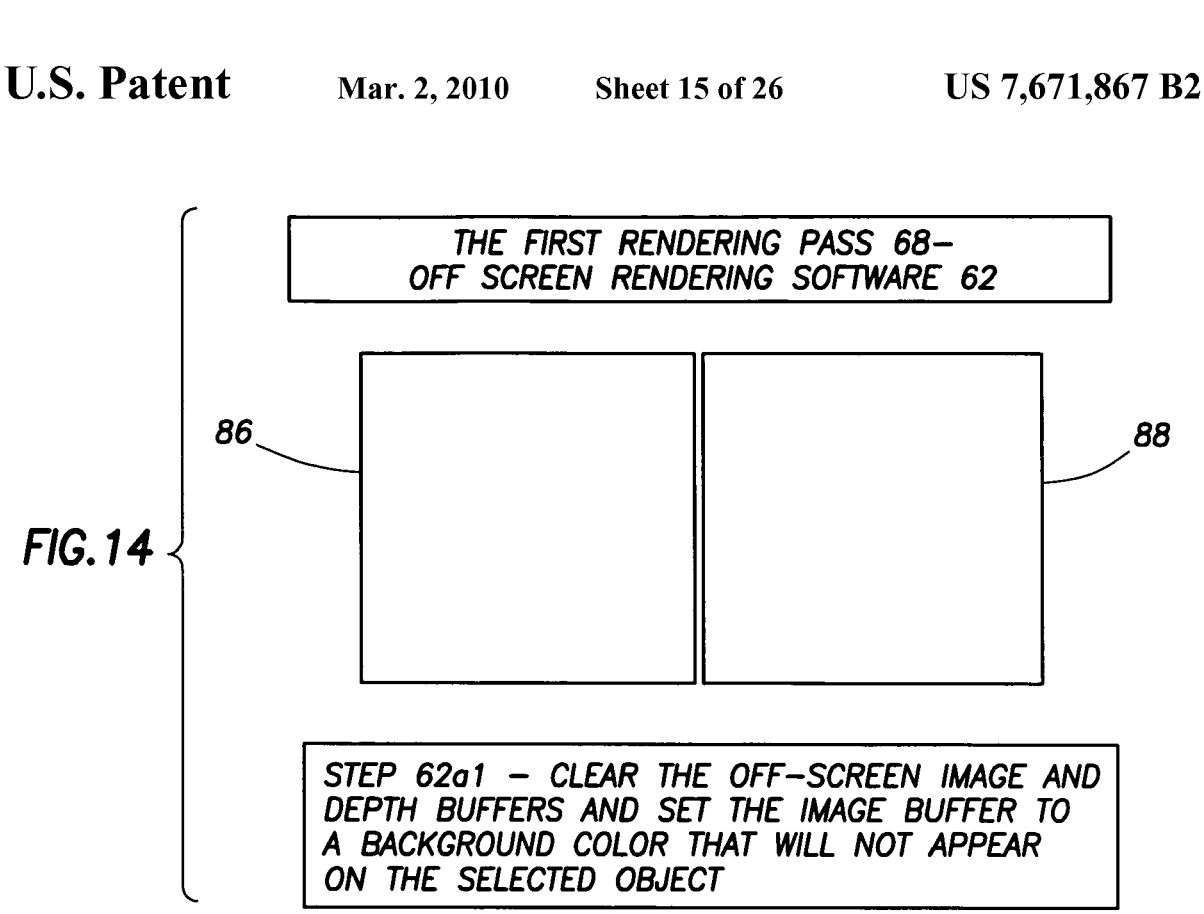
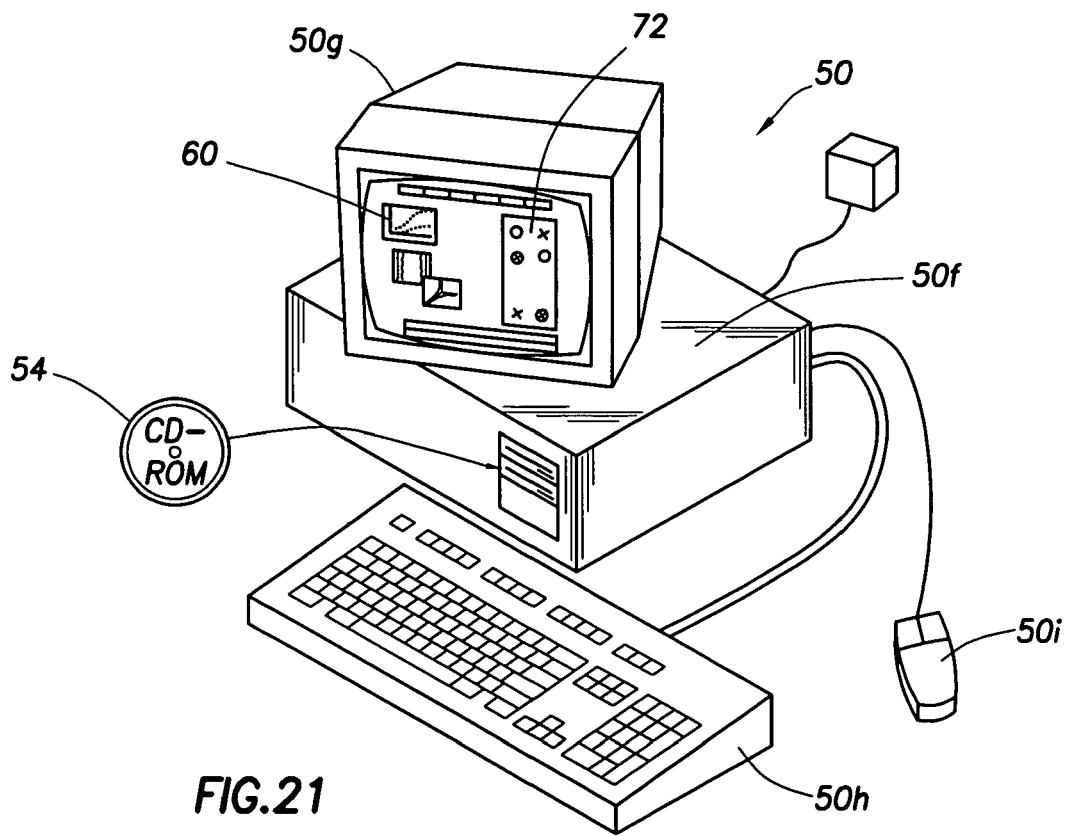

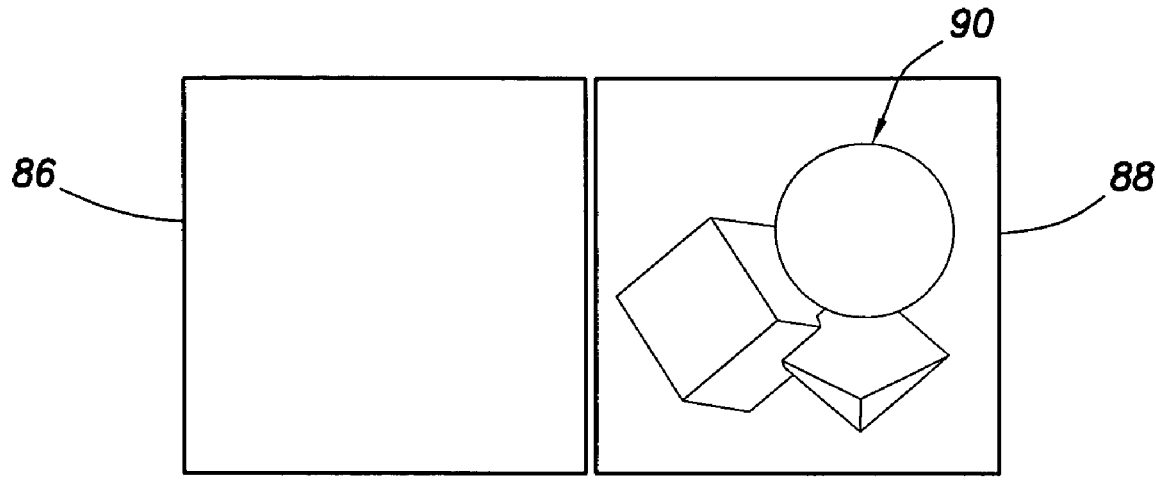

STEP 62a2 – RENDER ALL OBJECTS IN THE SCENE EXCEPT FOR THE SELECTED OBJECTS INTO THE DEPTH BUFFERS, AND DISCARDING ANY COLOR INFORMATION

RENDER ALL OBJECTS IN THE SCENE EXCEPT FOR THE SELECTED OBJECT INTO THE DEPTH BUFFERS (RIGHT) AND (LEFT) DEPTH. THE DARKER GRAY LEVEL INDICATES THAT THE OBJECT'S PIXEL IS CLOSER TO THE VIEWER. DURING THE LATER RENDERING ONLY THE PIXELS THAT ARE CLOSER TO THE VIEWER WILL BE RENDERED IN THE IMAGE BUFFER

FIG.15

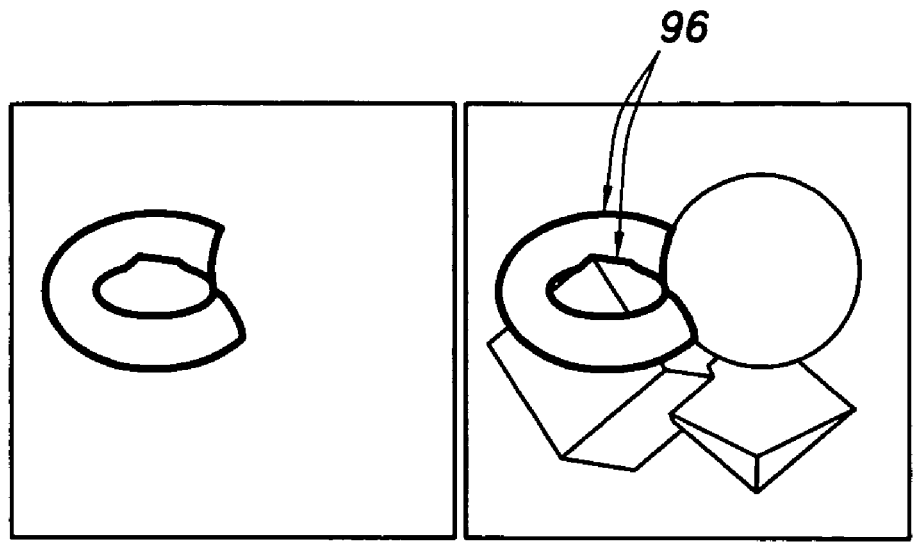

STEP 64b2 – APPLY THE FRAGMENT SHADER SOFTWARE 66 TO THE SCREEN-ALIGNED QUAD TO DRAW SILHOUETTE OF THE SELECTED OBJECT. THE FRAGMENT SHADER SOFTWARE 66 USES THE IMAGE TEXTURE CREATED BY STEP 62a3.

THE FRAGMENT SHADER SOFTWARE 66 DRAWS, ON TOP OF THE SCREEN-ALIGNED QUAD, A SILHOUETTE OF THE SELECTED OBJECT USING IMAGE CREATED BY STEP 62a3 (LEFT). THE VIEWER SEES THE SELECTED OBJECT AS OUTLINED (RIGHT).

FIG.19

METHOD FOR LOCATING UNDERGROUND DEPOSITS OF HYDROCARBON INCLUDING A METHOD FOR HIGHLIGHTING AN OBJECT IN A THREE DIMENSIONAL SCENE

CROSS REFERENCE TO RELATED APPLICATIONS

This is a Utility Application of prior pending Provisional Application Ser. No. 60/798,610 filed May 8, 2006, entitled "Method for Highlighting an Object in an Arbitrary Three Dimensional Scene"

BACKGROUND

The subject matter disclosed in this specification relates to a method for locating underground deposits of hydrocarbon including a method for producing oil or gas from an Earth formation that utilizes a highlighting method (and its associated system and computer program and program storage device) for highlighting an object in a three dimensional scene, the highlighting method being practiced by a software package adapted to be stored in a workstation, the software package representing a three-dimensional (3D) visualization product that will highlight objects in an arbitrary three-dimensional (3D) scene.

In most of 3D visualization applications, the user must select an object (e.g., a well, a horizon, or a fault) in the application data tree or list in order to perform some operation. In order to accentuate a selected object among other objects in the tree or list, the selected object can be highlighted. It is also desirable to highlight the selected object in the application 3D window. This specification discloses a software package, known as a "Highlighting Software", that is adapted to be stored in a computer system. When the "Highlighting Software" is executed by a Central Processing Unit (CPU) and a Graphical Processing Unit (GPU) of the computer system, the computer system will highlight objects in an arbitrary three-dimensional (3D) scene that is being recorded or displayed on the computer system's recorder or display device.

SUMMARY

One aspect of the present invention involves a method for extracting underground deposits of hydrocarbon from a formation, comprising: generating input data including a well log output record and a seismic data output record; receiving the input data and generating an output display including a silhouette highlight of a selected object, the step of generating the output display including, rendering a selected object and a 3D scene into off screen image and depth buffers and generating a texture image containing an image of a set of visible parts of the selected object over a background color, in response to the texture image, re-rendering a whole 3D scene on screen where all objects are re-rendered normally; and adding a screen-aligned transparent quad object to the 3D scene and rendering the quad by drawing a silhouette highlight of the selected object; determining, from the output display, a particular location in the formation where the underground deposits of hydrocarbon are located; and extracting the underground deposits of hydrocarbon from the particular location in the formation.

Another aspect of the present invention involves a system adapted for extracting underground deposits of hydrocarbon from a formation, comprising: first apparatus adapted for generating input data including a well log output record and a seismic data output record; second apparatus adapted for receiving the input data and generating an output display including a silhouette highlight of a selected object, the second apparatus including, apparatus adapted for rendering a selected object and a 3D scene into off screen image and depth buffers and generating a texture image containing an image of a set of visible parts of the selected object over a background color, apparatus, responsive to the texture image, adapted for re-rendering a whole 3D scene on screen where all objects are re-rendered normally; and apparatus adapted for adding a screen-aligned transparent quad object to the 3D scene and rendering the quad by drawing a silhouette highlight of the selected object; means for determining, from the output display, a particular location in the formation where the underground deposits of hydrocarbon are located; and means for extracting the underground deposits of hydrocarbon from the particular location in the formation.

Another aspect of the present invention involves a method of highlighting a selected object in a 3D scene, comprising: (a) executing an off screen rendering software and, responsive thereto, generating a texture image containing an image of the visible parts of a selected object over a background color, and (b) in response to the texture image, executing an on screen rendering software in combination with a fragment shader software thereby drawing a silhouette of the selected object.

Another aspect of the present invention involves a program storage device readable by a machine tangibly embodying a program of instructions executable by the machine to perform method steps for highlighting a selected object in a 3D scene, the method steps comprising: (a) executing an off screen rendering software and, responsive thereto, generating a texture image containing an image of the visible parts of a selected object over a background color, and (b) in response to the texture image, executing an on screen rendering software in combination with a fragment shader software thereby drawing a silhouette of the selected object.

Another aspect of the present invention involves a computer program adapted to be executed by a processor, the computer program, when executed by the processor, conducting a process for highlighting a selected object in a 3D scene, the process comprising: (a) executing an off screen rendering software and, responsive thereto, generating a texture image containing an image of the visible parts of a selected object over a background color, and (b) in response to the texture image, executing an on screen rendering software in combination with a fragment shader software thereby drawing a silhouette of the selected object.

Another aspect of the present invention involves a system adapted for highlighting a selected object in a 3D scene, comprising: first apparatus adapted for executing an off screen rendering software and, responsive thereto, generating a texture image containing an image of the visible parts of a selected object over a background color, and second apparatus, responsive to the texture image, adapted for executing an on screen rendering software in combination with a fragment shader software thereby drawing a silhouette of the selected object.

Further scope of applicability will become apparent from the detailed description presented hereinafter. It should be understood, however, that the detailed description and the specific examples set forth below are given by way of illustration only, since various changes and modifications within the spirit and scope of the 'Highlighting Software', as described and claimed in this specification, will become obvious to one skilled in the art from a reading of the following detailed description. The described method does not depend on a particular rendering library (OpenGL, DirectX, etc.) or a GPU shading language (OpenGL Shading Language, Cg Shading Language, or DirectX High Level Shading Language, etc.) that is used to implement such method.

BRIEF DESCRIPTION OF THE DRAWINGS

A full understanding will be obtained from the detailed description presented herein below, and the accompanying drawings which are given by way of illustration only and are not intended to be limitative to any extent, and wherein:

FIGS. 13 through 19 illustrate in greater detail the steps of the flowchart/block diagram illustrated in FIG. 12;

FIG. 21 illustrates a workstation or other computer system including a computer monitor, wherein the 'third display' 60 in FIG. 10 and/or said 'another display' of FIG. 20 are adapted to be displayed on the computer monitor display screen associated with the workstation or other computer system of FIG. 21 so that a user/operator sitting at the workstation of FIG. 21 can locate oil and/or gas at a 'particular location' of an Earth formation.

DETAILED DESCRIPTION

Figure 20:
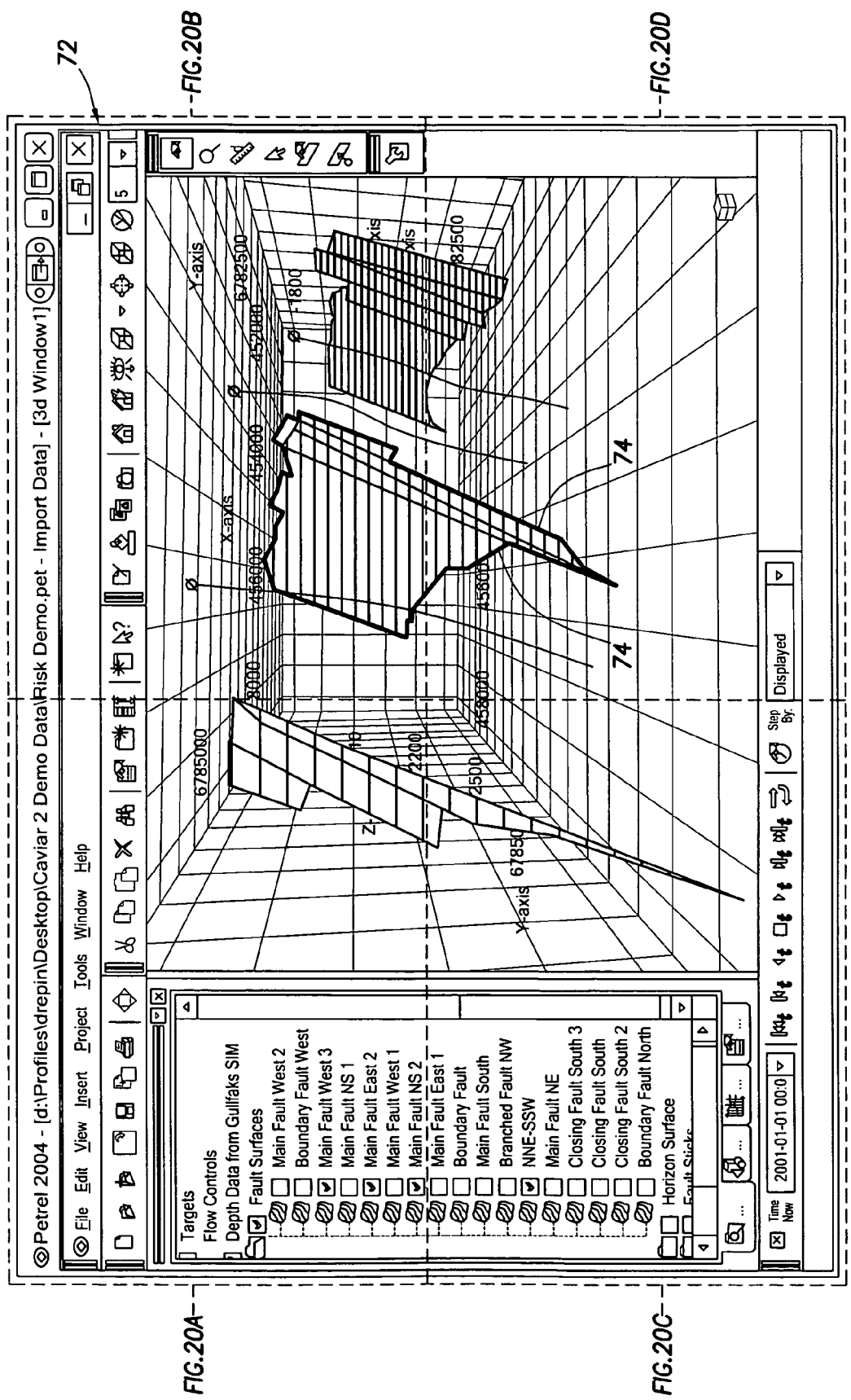
FIG. 20 illustrates 'another display' which would be recorded or displayed on the recorder or display device of the computer system of FIG. 8, which is similar to the 'third display' 60 in FIG. 10, that shows how a 'selected fault' would appear in a '3D window' being displayed on the 'Recorder or Display Device' of FIG. 8 when the 'silhouette highlighting' method (practiced by the 'Highlighting Software for Highlighting Selected Objects in a 3D Scene' of FIG. 8) is executed by the GPU 20a and CPU 20e of FIG. 8.
Figure 20A:
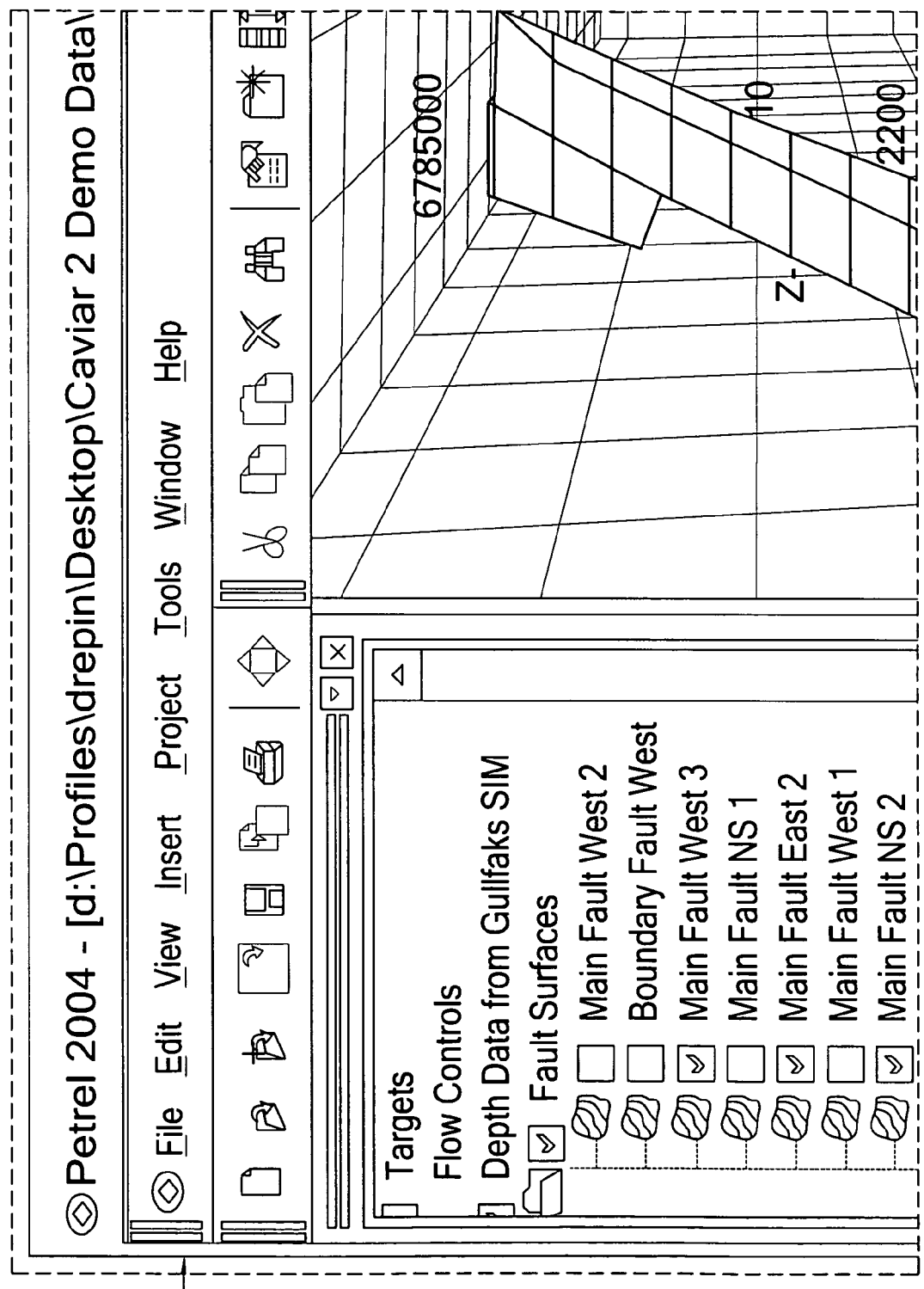
Figure 20B:
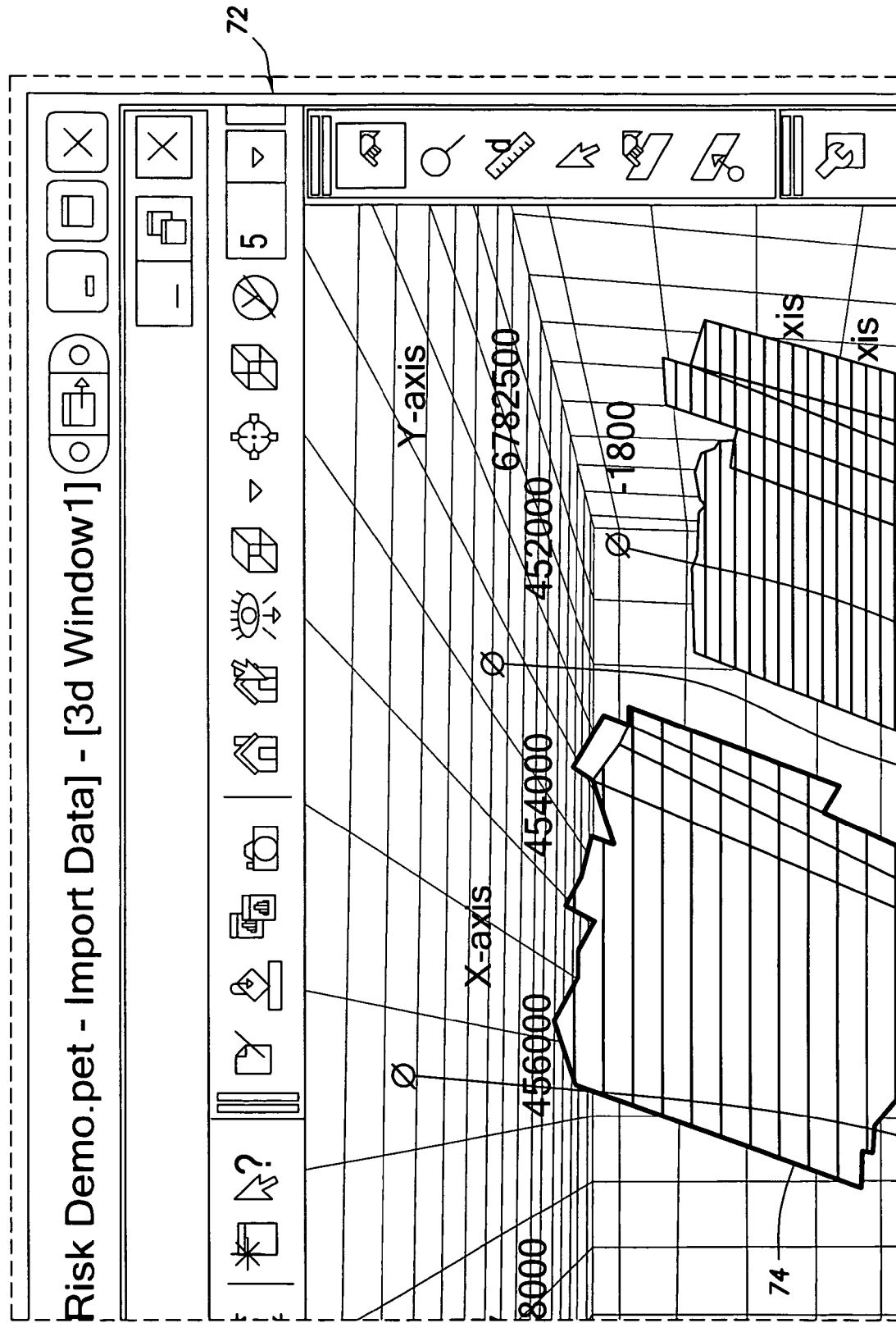
Figure 20C:
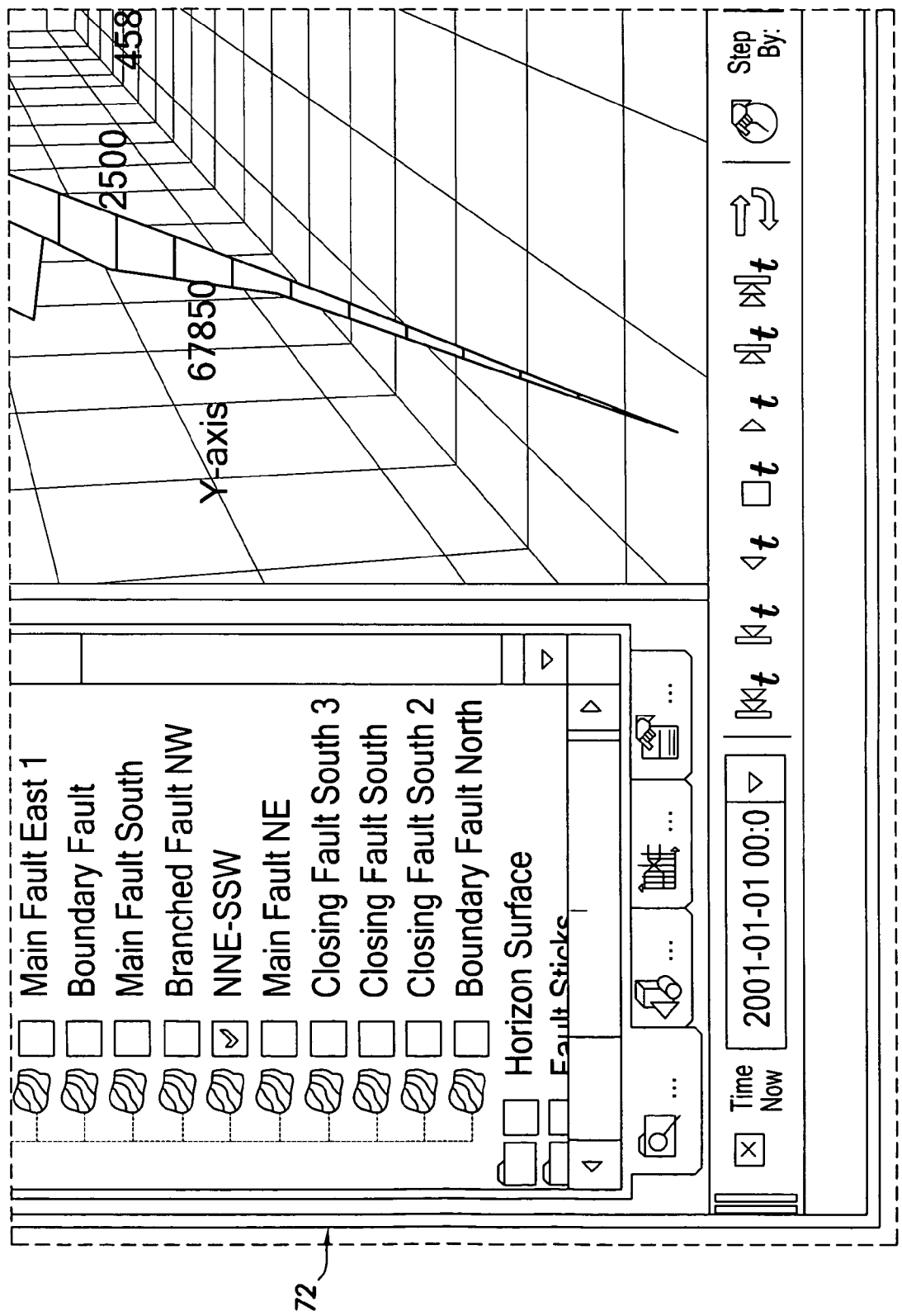
Figure 20D:
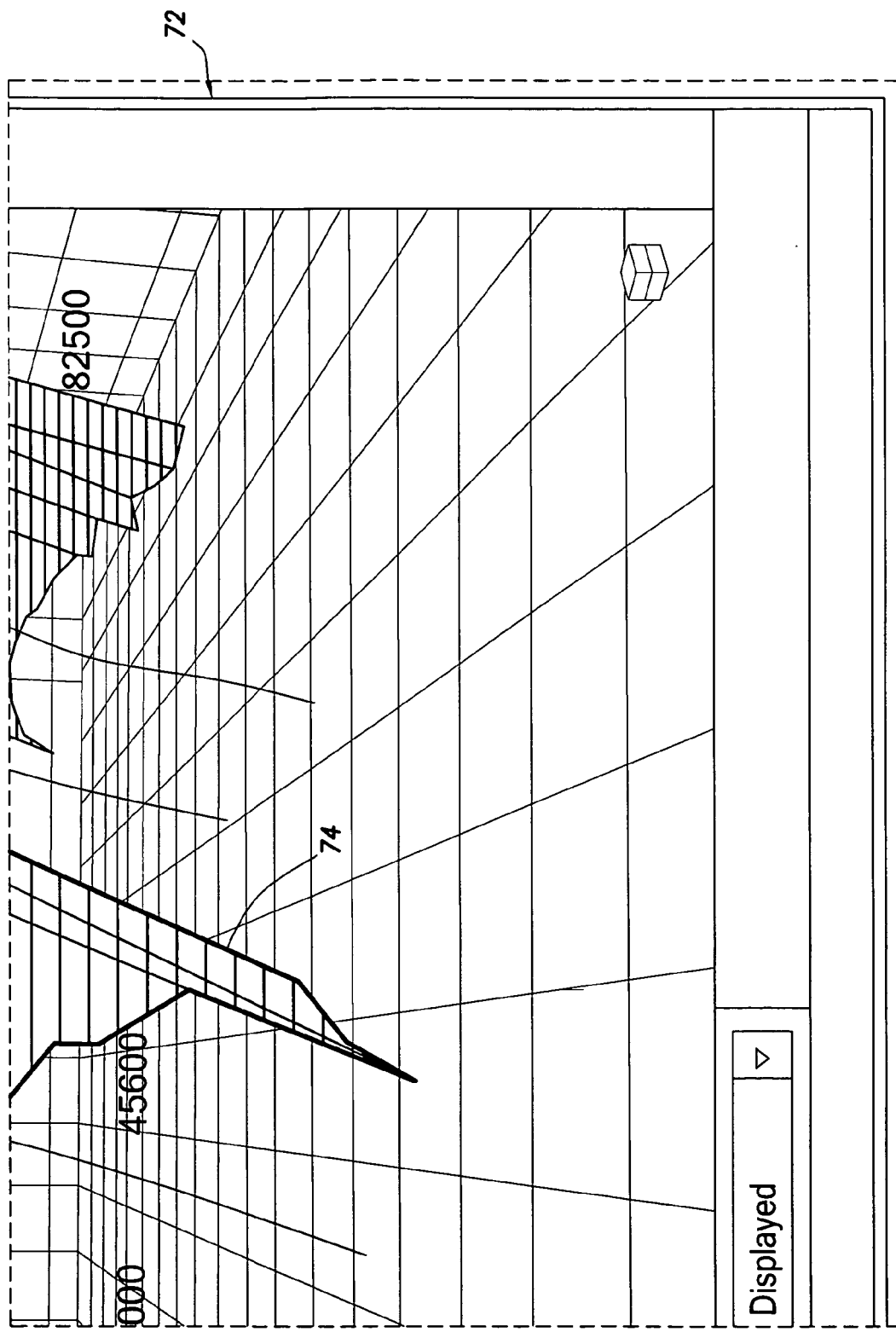

This specification discloses a 'silhouette highlighting' method (such as the 'silhouette highlighting' illustrated in the 'third display' 60 in FIG. 10 and shown again in FIG. 20) that will significantly improve the usability and understandability of three-dimensional (3D) scenes that are generated by 3D visualization software products. A Central Processing Unit (CPU) and a Graphical Processing Unit (GPU) of the computer system of FIG. 8, to be discussed below, will execute the 'Highlighting Software' described in this specification to thereby practice a 'silhouette highlighting' method in order to highlight objects in 3D applications (see the 'third display' 60 of FIG. 10 and shown again in FIG. 20). The aforementioned 'silhouette highlighting' method (that is practiced by the 'Highlighting Software' disclosed in this specification) will not obscure any part of the highlighted object. Thus, the aforementioned 'Central Processing Unit (CPU)' and 'Graphical Processing Unit (GPU)' (of FIG. 8) will execute the 'Highlighting Software' to practice and implement a 'silhouette highlighting' method disclosed in this specification, where the 'silhouette highlighting' method is used to: highlight an object in an arbitrary three-dimensional (3D) scene by outlining the visible parts of a selected object in the 3D scene, or by outlining the whole object with a special rendering style used to highlight hidden object parts, or create an aura-like glow around the object.

Therefore, a new 'silhouette highlighting' method or technique disclosed in this specification has been developed that utilizes both a Central Processing Unit (CPU) and a Graphical Processing Unit (GPU) (of FIG. 8) to draw, at interactive frame rates, an outline of an object in an arbitrary three-dimensional scene. The 'Highlighting Software for Highlighting Selected Objects in a 3D Scene' disclosed in this specification with reference to FIGS. 8, 11, and 12, which practices the aforementioned new 'silhouette highlighting' method or technique, is intended to provide a much more visually appealing and robust selected object highlighting (seen in FIG. 10 as the 'third display' 60 and seen again in FIG. 20) as compared to the previously known highlighting techniques, known as 'SoBoxHighlightRenderAction' (the 'first display' of FIG. 10) and 'SoLineHighlightRenderAction' of OpenInventor® (the 'second display' of FIG. 10). This new 'silhouette highlighting' method disclosed in this specification with reference to FIGS. 11 and 12 can significantly improve usability and understandability of three-dimensional scenes rendered by such 3D visualization products as 'Petrel' or 'GeoFrame GeoViz' which are owned and operated by Schlumberger Technology Corporation of Houston, Tex. Variations of the proposed technique can be used to create: (1) a simple outline of the visible parts of a selected object, (2) an outline of the whole object with a special rendering style used to highlight hidden object parts, or (3) an aura-like glow around the object.

Refer now to FIGS. 1 through 7 of the drawings.

Figure 1:
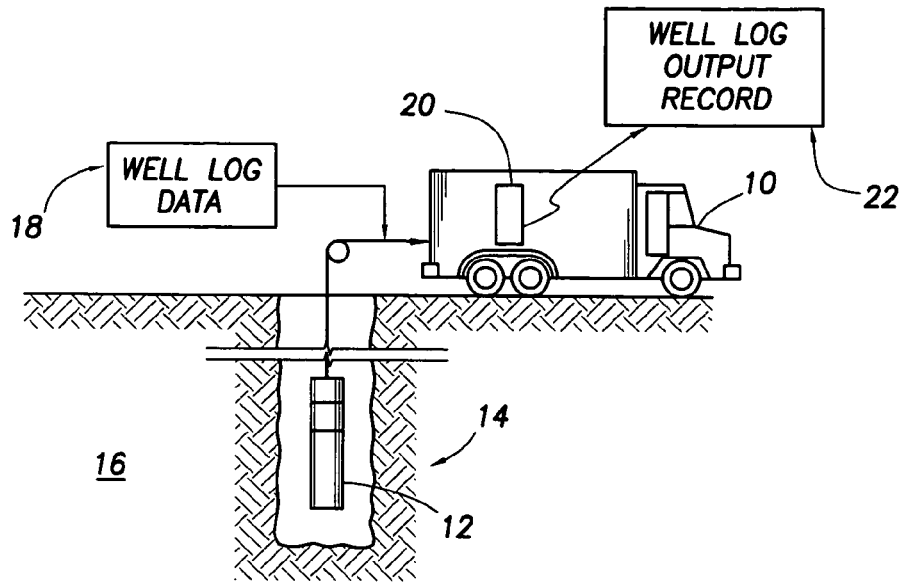
FIG. 1 illustrates a well logging operation being performed at a wellbore for generating a well log output record.

In FIG. 1, a well logging truck 10 lowers a logging tool 12 into the wellbore 14 and the logging tool 12 stimulates and energizes the Earth formation 16. In response, sensors in the logging tool 12 receive signals from the formation 16, and, in response thereto, other signals representative of well log data 18 propagate uphole from the logging tool 12 to a well logging truck computer 20. A well log output record 22 is generated by the well logging truck computer 20 which displays the well log data 18.

Figure 2:
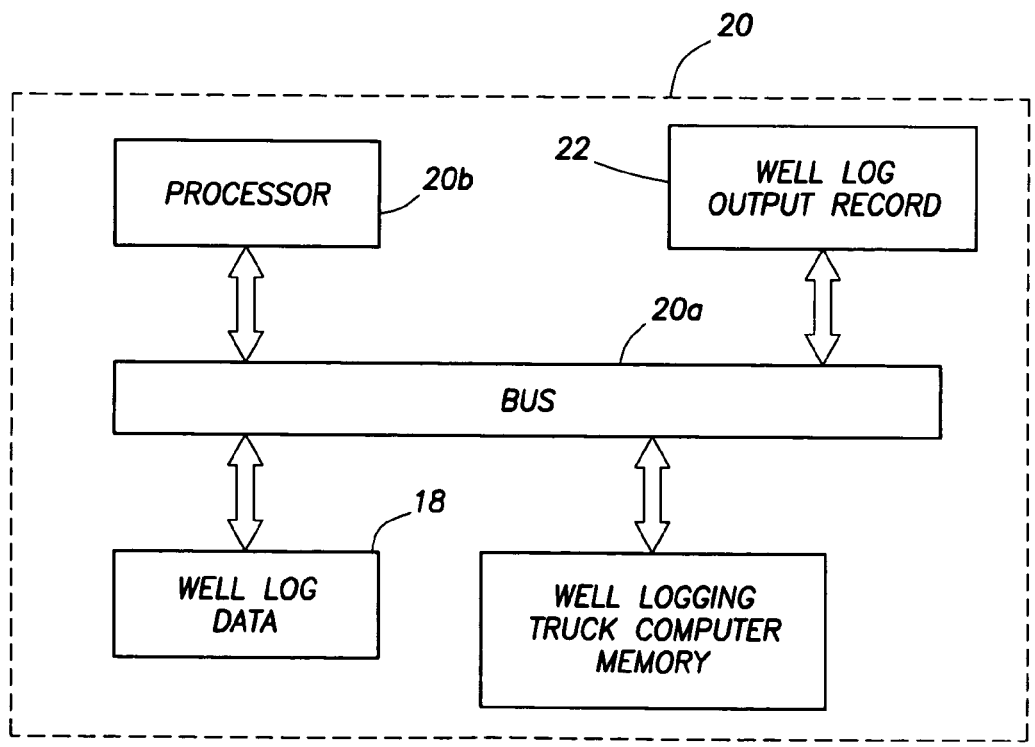
FIG. 2 illustrates the well logging truck computer of FIG. 1 which generates the well log output record.

In FIG. 2, a more detailed construction of the well logging truck computer 20 is illustrated. A bus 20a receives the well log data 18 and, responsive thereto, the well log output record 22 is generated by the processor 20b, the well log output record 22 displaying and/or recording the well log data 18. The well log output record 22 is input to the interpretation workstation of FIGS. 7 and 8.

Figure 3:
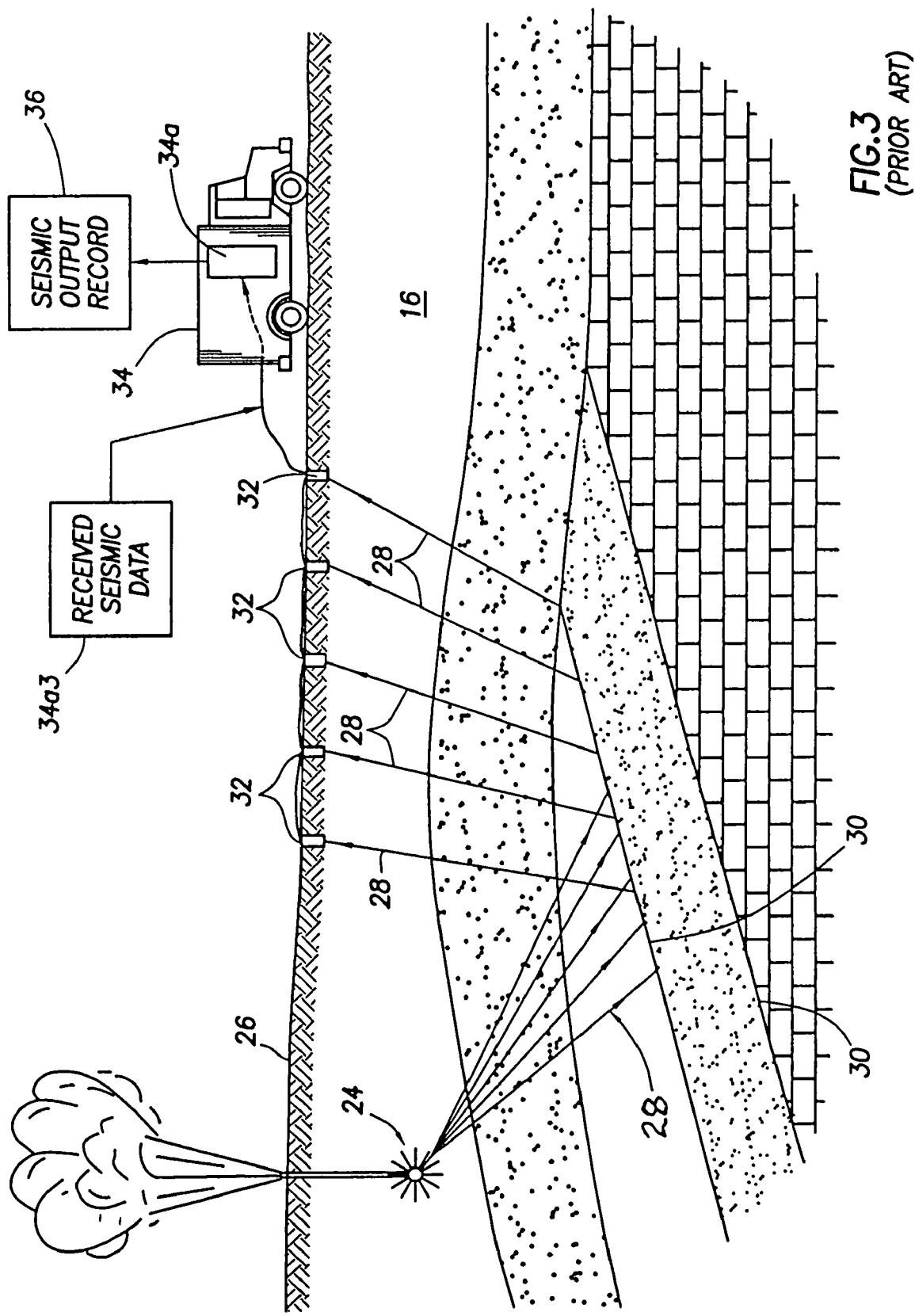
FIGS. 3 through 6 illustrate a seismic operation performed near the wellbore of FIG. 1 adapted for generating seismic data, and, in particular, a reduced seismic data output record.
Figure 4:
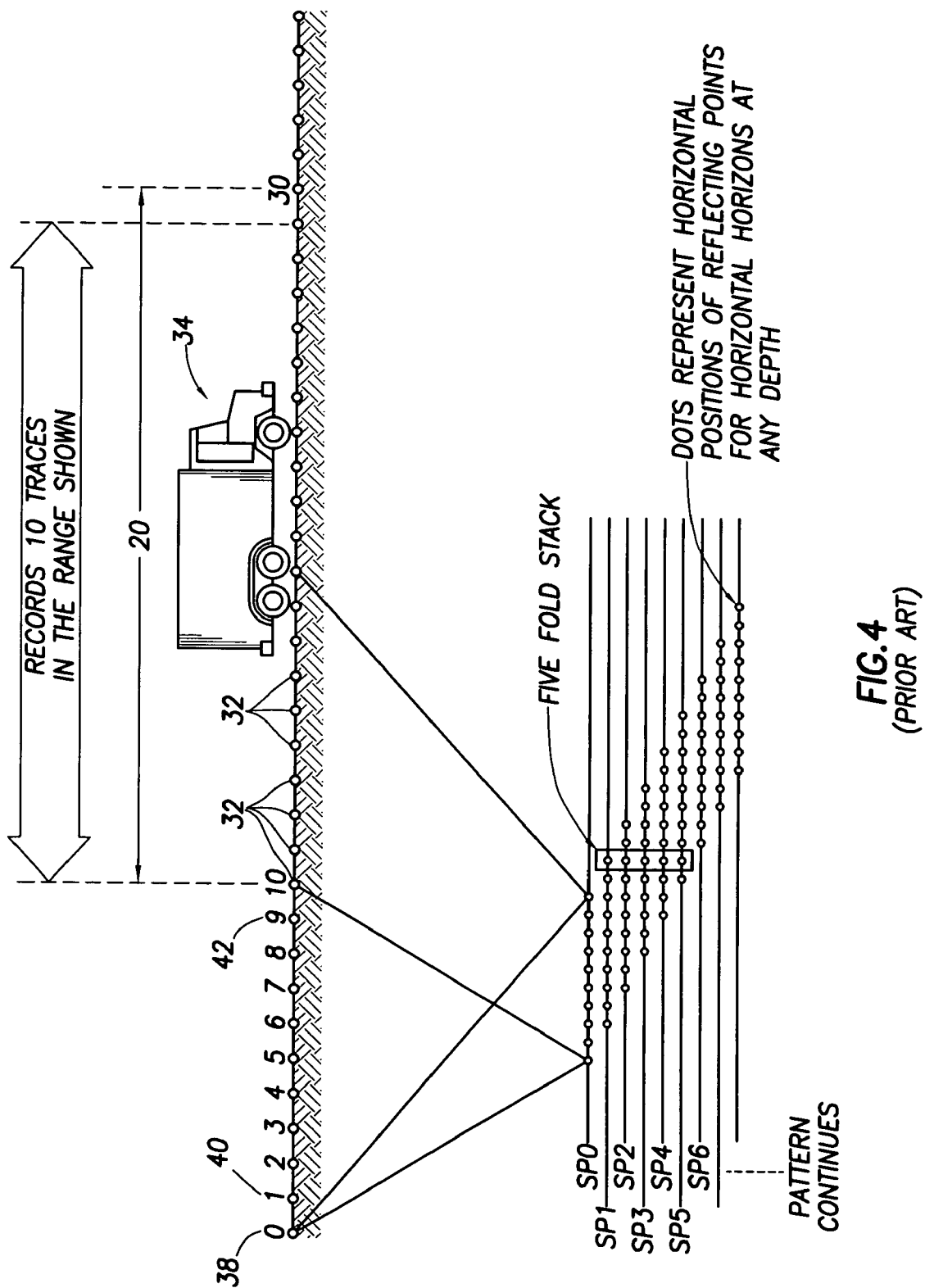

In FIGS. 3 and 4, an apparatus and associated method for performing a three dimensional (3D) seismic operation at a location on the earth's surface near the wellbore of FIG. 1 is illustrated.

In FIG. 3, an explosive or acoustic energy source 24 situated below the surface of the earth 26 detonates and generates a plurality of sound or acoustic vibrations 28 which propagate downwardly and reflect off a horizon layer 30 within the Earth formation 16. The horizon layer 30 could be a top layer of rock or sand or shale. When the sound vibrations reflect off the horizon layer 30, the sound vibrations 28 will propagate upwardly and will be received in a plurality of receivers 32 called geophones 32 situated at the surface of the earth. The plurality of geophones 32 will each generate an electrical signal in response to the receipt of a sound vibration therein and a plurality of electrical signals will be generated from the geophones 32, the plurality of signals being received in a recording truck 34. The plurality of electrical signals from the geophones 32 represent a set of characteristics of the earth formation including the horizons 30 located within the earth below the geophones 32. The recording truck 34 contains a computer 34a which will receive and store the plurality of signals received from the geophones 32. A seismic output record 36 will be generated from the computer 34a in the recording truck 34 which will include and/or display and/or store the plurality of electrical signals that are representative of the characteristics of the earth formation including the horizons 30 located within the earth below the geophones 32.

In FIG. 4, another method and apparatus for performing a 3D seismic operation is illustrated. FIG. 4 was taken from a book entitled "Seismic Velocity Analysis and the Convolutional Model", by Enders A. Robinson, the disclosure of which is incorporated by reference into this specification. The 3D seismic operation of FIG. 3 is performed 10 different times. For example, when the explosive energy source 24 is located at position 38 (the first position or position "0" along the surface of the earth) in FIG. 4, a first plurality of electrical signals from the geophones 32 are stored in the computer 34a in the recording truck 34. The explosive energy source is moved to position 40. When the explosive energy source 24 is located in position 40 (the second position or position "1" along the surface of the earth), a second plurality of electrical signals are stored in the computer 34a in the recording truck 34. The explosive energy source 24 is repeatedly and sequentially moved from positions "2" to "9" in FIG. 4 until it is located at position 42 (i.e.—position "9" which is the tenth position) on the surface of the earth. When the explosive energy source 24 is located in position 42 (the tenth position along the surface of the earth), a tenth plurality of electrical signals are stored in the computer 34a in the recording truck 34. As a result, in FIG. 4, the recording truck 34 records 10 traces (ten sets of electrical signals, where each set is a plurality of electrical signals) between position 38 and position 42 along the surface of the earth. A seismic output record 36 will be generated by the computer 34a in the recording truck 34 which includes the 10 traces or ten set of electrical signals received from the geophones 32.

Figure 5:
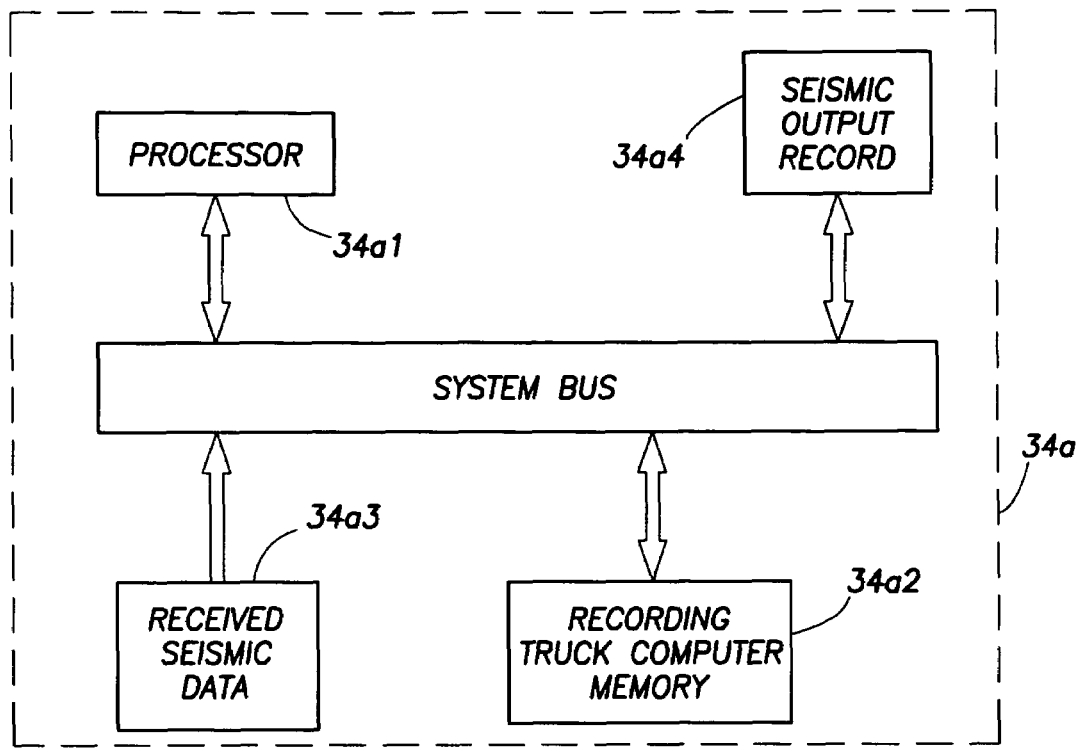

In FIG. 5, a more detailed construction of the recording truck computer 34a is illustrated. The recording truck computer 34a of FIG. 3 includes a processor 34a1 and a memory 34a2 connected to a system bus. The ten traces or ten sets of electrical signals (received from the geophones 32 during the 3D seismic operation) would be received into the recording truck computer 34a via the "Received Seismic Data" block 34a3 in FIGS. 3 and 5 and would be stored in the memory 34a2 of the recording truck computer 34a. When desired, a seismic output record 34a4 is generated by the recording truck computer 34a, the seismic output record 34a4 being adapted for recording and displaying "a plurality of seismic data" representing the ten traces or ten sets of electrical signals received by the recording truck computer 34a from the geophones 32.

Figure 6:
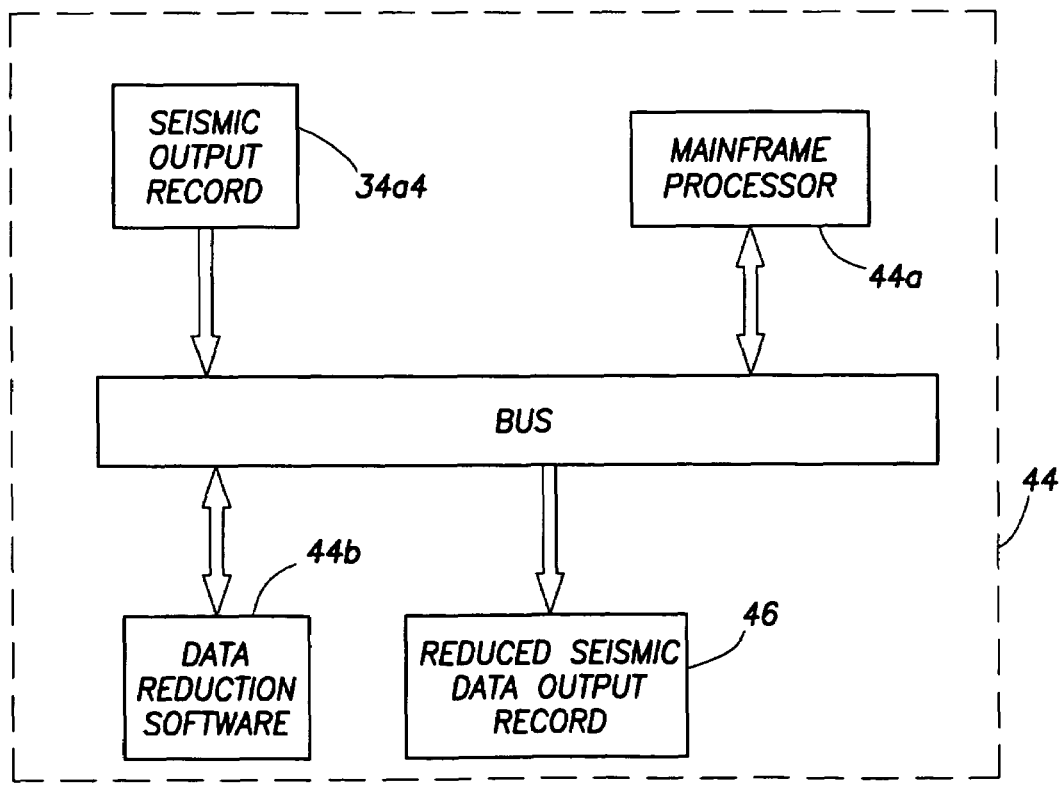

In FIG. 6, a simplified diagram of a mainframe computer 44 is illustrated which uses a stored "data reduction software" to perform a "data reduction" operation on the "plurality of seismic data" included in the seismic output record 34a4 of FIG. 5. The mainframe computer 44 produces a "reduced seismic data output record" 46 in FIG. 6 which is adapted for recording and displaying information that represents "reduced" versions of the "plurality of seismic data" included in the seismic output record 34a4 of FIG. 6. The mainframe computer 44 of FIG. 6 includes a mainframe processor 44a connected to a system bus and a memory 44b also connected to the system bus which stores a "data reduction software" therein. The seismic output record 34a4 of FIG. 5, which includes the "plurality of seismic data", is connected to the system bus of the mainframe computer 44 of FIG. 6. As a result, the "plurality of seismic data", included in the seismic output record 34a4 of FIG. 5, is now being input to the mainframe processor 44a of FIG. 6. The processor 44a of the mainframe computer 44 in FIG. 6 executes the "data reduction software" stored in the memory 44b of the mainframe computer. The "data reduction software", which is stored in the memory 44b of the mainframe computer 44 of FIG. 6, can be found in a book entitled "Seismic Velocity Analysis and the Convolutional Model", by Enders A. Robinson, the disclosure of which is incorporated by reference into this specification. When the "data reduction software" in memory 44b is executed, the mainframe processor 44a will perform a "data reduction" operation on the "plurality of seismic data" that is included in the seismic output record 34a4 of FIG. 6. When the "data reduction operation" is complete, the mainframe processor 44a will generate a "reduced seismic data output record" 46 which will record and is adapted for displaying information: representing a "reduced version" of the "plurality of seismic data" included in the seismic output record 34a4 of FIG. 6, and including a set of characteristics pertaining to the earth formation located near the wellbore of FIG. 1, the characteristics including the location and structure of the horizons 30 of FIG. 3.

Figure 7:
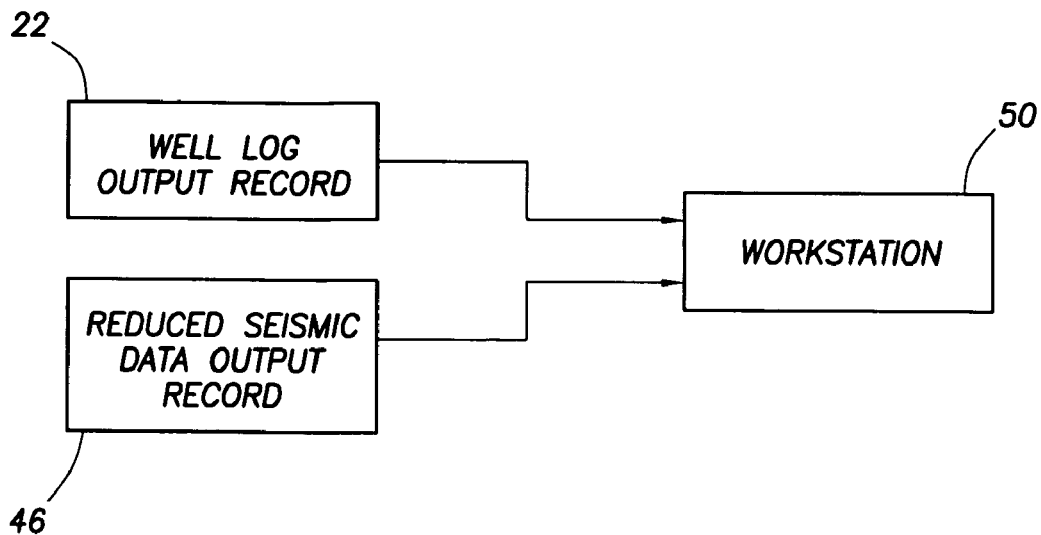
FIGS. 7 and 8 illustrate an interpretation computer workstation which receives the well log output record and the reduced seismic data output record of FIGS. 2 and 6 for executing an interpretation program stored in its memory, FIG. 8 representing a workstation or other computer system that stores a 'Highlighting Software for Highlighting Selected Objects in a 3D Scene' that is disclosed in the Detailed Description section of this specification.
Figure 10:
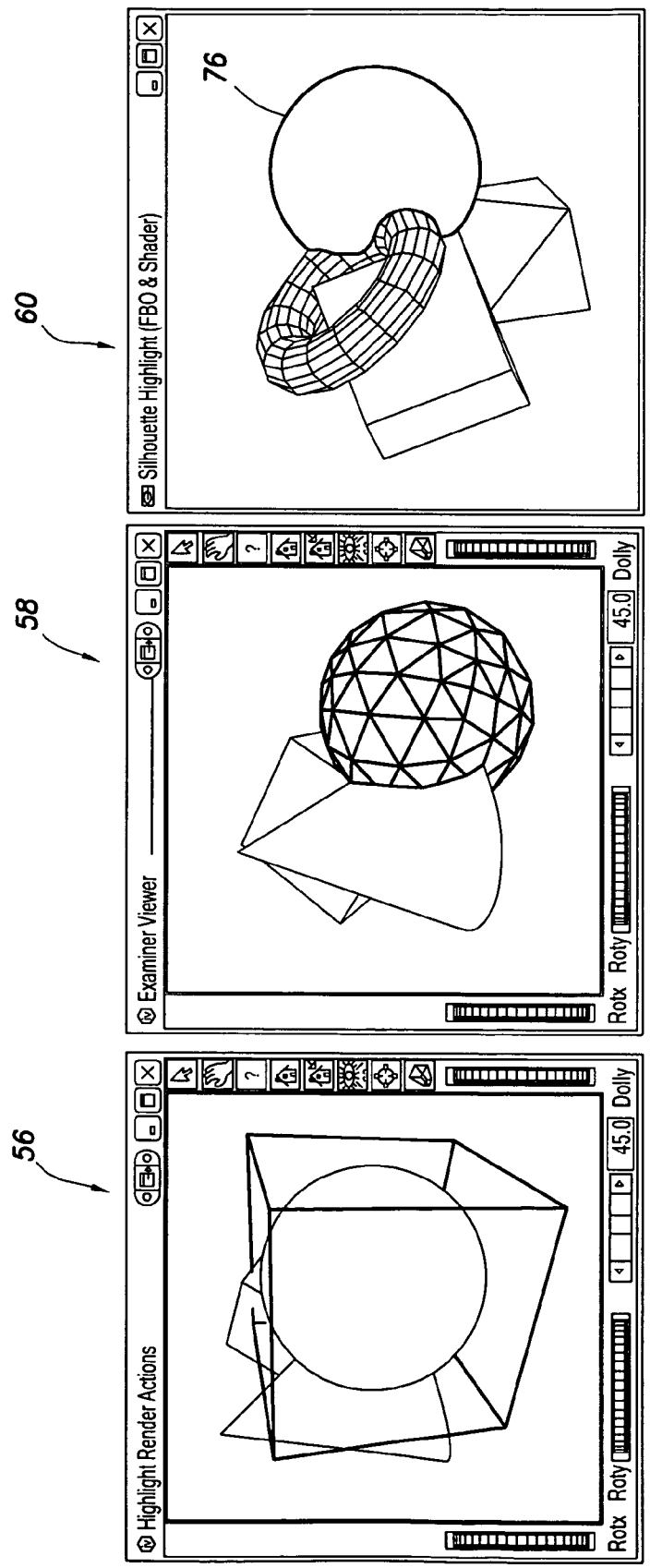
FIG. 10 illustrates three software application displays involving different object highlighting techniques which will highlight a 'selected object' in a 3D window thereby improving the usability and the understandability of an application, the three software application displays including the following: (1) Open Inventor® 'SoBoxHighlightRenderAction' representing a 'first display' 56, (2) Open Inventors® 'SoLineHighlightRenderAction' representing a 'second display' 58, and (3) a 'silhouette highlight' representing a 'third display' 60 in FIG. 10, wherein the 'first display' and the 'second display' 56 and 58 represent highlighting techniques that were used in computer graphics, however, the 'third display' 60 represents a new highlighting method or technique (known as a 'silhouette highlighting' method or technique) that is disclosed in this specification, the 'silhouette highlighting' technique associated with the 'third display' 60 of FIG. 10 being disclosed in the Detailed Description section of this specification with reference to FIGS. 8 through 13 of the drawings.

In FIG. 7, the well log output record 22 of FIG. 2 and the reduced seismic data output record 46 of FIG. 6 are both input to an interpretation workstation or other computer system 50. This computer system 50 stores a 'Highlighting Software for Highlighting Selected Objects in a 3D Scene' which practices a new 'silhouette highlighting' method or technique that is adapted for drawing, at interactive frame rates, an outline of an object in an arbitrary three-dimensional scene in order to provide a much more visually appealing and robust selected object highlighting (as shown in FIG. 10 as the 'third display' 60 and as shown again in FIG. 20) as compared to previously known highlighting techniques.

Figure 8:
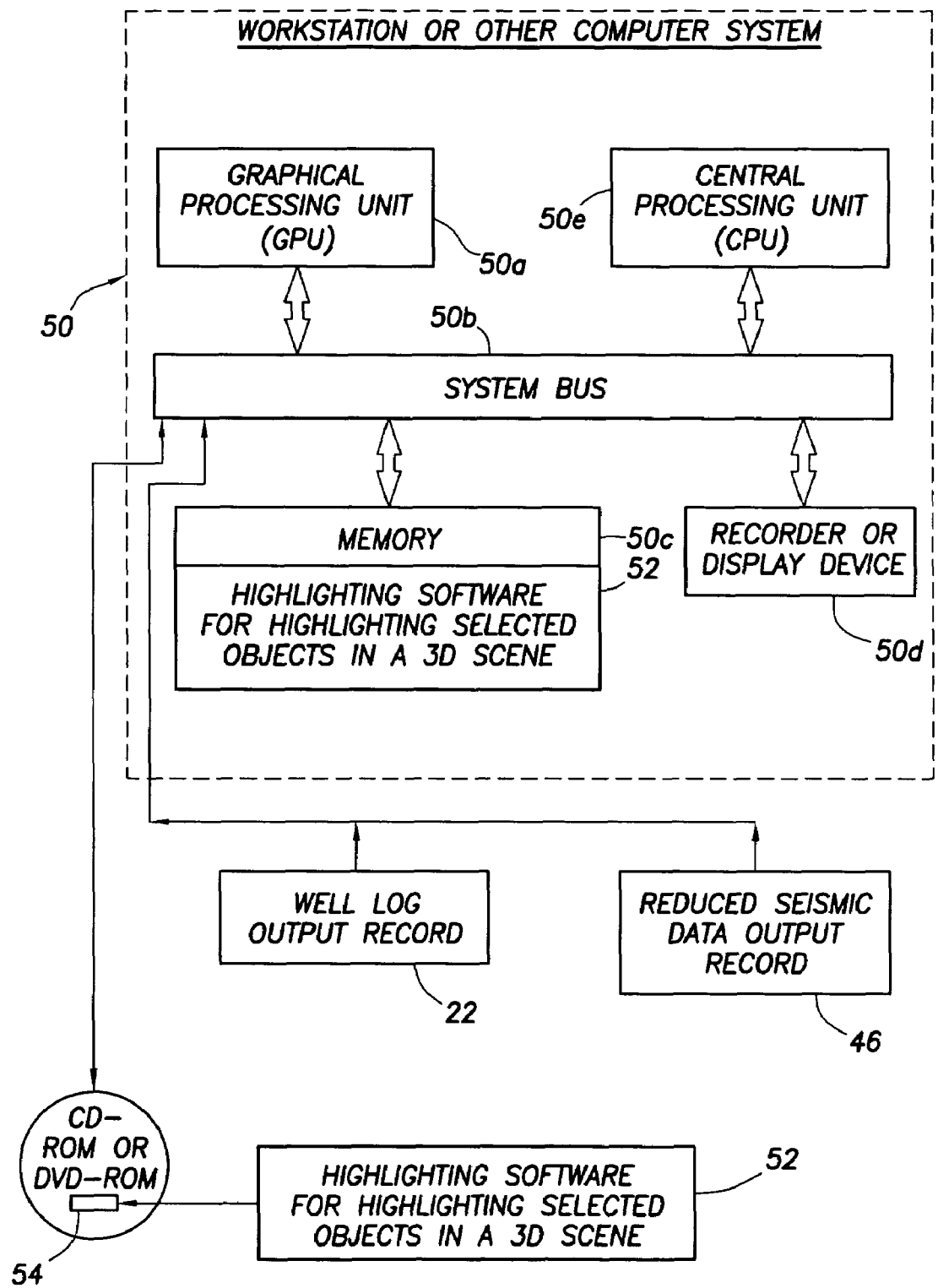

Referring to FIG. 8, a workstation or other computer system is illustrated which stores the novel 'Highlighting Software for Highlighting Selected Objects in a 3D Scene' 52 that is disclosed in this specification.

In FIG. 8, a workstation, personal computer, or other computer system 50 is illustrated adapted for storing a 'Highlighting Software for Highlighting Selected Objects in a 3D Scene'. The computer system 50 of FIG. 8 includes a Central Processing Unit (CPU) 50e and a Graphical Processing Unit (GPU) 50a operatively connected to a system bus 50b, a memory or other program storage device 50c operatively connected to the system bus 50b, and a recorder or display device 50d operatively connected to the system bus 50b. The memory or other program storage device 50c stores a 'Highlighting Software for Highlighting Selected Objects in a 3D Scene' 52 that practices the new 'silhouette highlighting' method or technique previously discussed and disclosed in this specification. The 'Highlighting Software for Highlighting Selected Objects in a 3D Scene' 52, which is stored in the memory 50c of FIG. 8, can be initially stored on a CD-ROM or a DVD-ROM 54, where that CD-ROM or DVD-ROM 54 is also a 'program storage device'. That CD-ROM or DVD-ROM 54 can be inserted into the computer system 50, and the 'Highlighting Software for Highlighting Selected Objects in a 3D Scene' 52 can be loaded from that CD-ROM or DVD-ROM 54 and into the memory/program storage device 50c of the computer system 50 of FIG. 8. The Central Processing Unit (CPU) 50e and the Graphical Processing Unit (GPU) 50a will execute the 'Highlighting Software for Highlighting Selected Objects in a 3D Scene' 52 that is stored in memory 50c of the computer system of FIG. 8; and, responsive thereto, the GPU 50a and CPU 50e will generate an 'output display' that is recorded or displayed on the Recorder or Display device 50d of the computer system of FIG. 8. That 'output display', which is recorded or displayed on the Recorder or Display device 50d of FIG. 8, is illustrated in FIG. 20. In addition, that 'output display' is also illustrated in FIG. 10, display number 60. Recall that the 'output display' generated by the Recorder or Display device 50d of FIG. 8, as shown in FIG. 20 and in FIG. 10 (display number 60), will generate and display a novel 'silhouette highlighting' wherein a 'highlight' is placed around a 'selected object' in a '3D scene', as discussed in this specification. The computer system 50 of FIG. 8 may be a personal computer (PC), a workstation, a microprocessor, or a mainframe. Examples of possible workstations include a Dell Precision notebook workstation or a Dell Dimension desktop computer or an HP Compaq Tablet PC or a Sun BLADE workstation. The memory or program storage device 50c (including the above referenced CD-ROM or DVD-ROM 54) is a 'computer readable medium' or a 'program storage device' which is readable by a machine, such as the CPU processor 50e or the GPU processor 50a. The CPU processor 50e may be, for example, a microprocessor, microcontroller, or a mainframe or workstation processor. The memory or program storage device 50c, which stores the 'Highlighting Software for Highlighting Selected Objects in a 3D Scene' 52, may be, for example, a hard disk, ROM, CD-ROM, DVD-ROM, DRAM, or other RAM, flash memory, magnetic storage, optical storage, registers, or other volatile and/or non-volatile memory.

Figure 9:
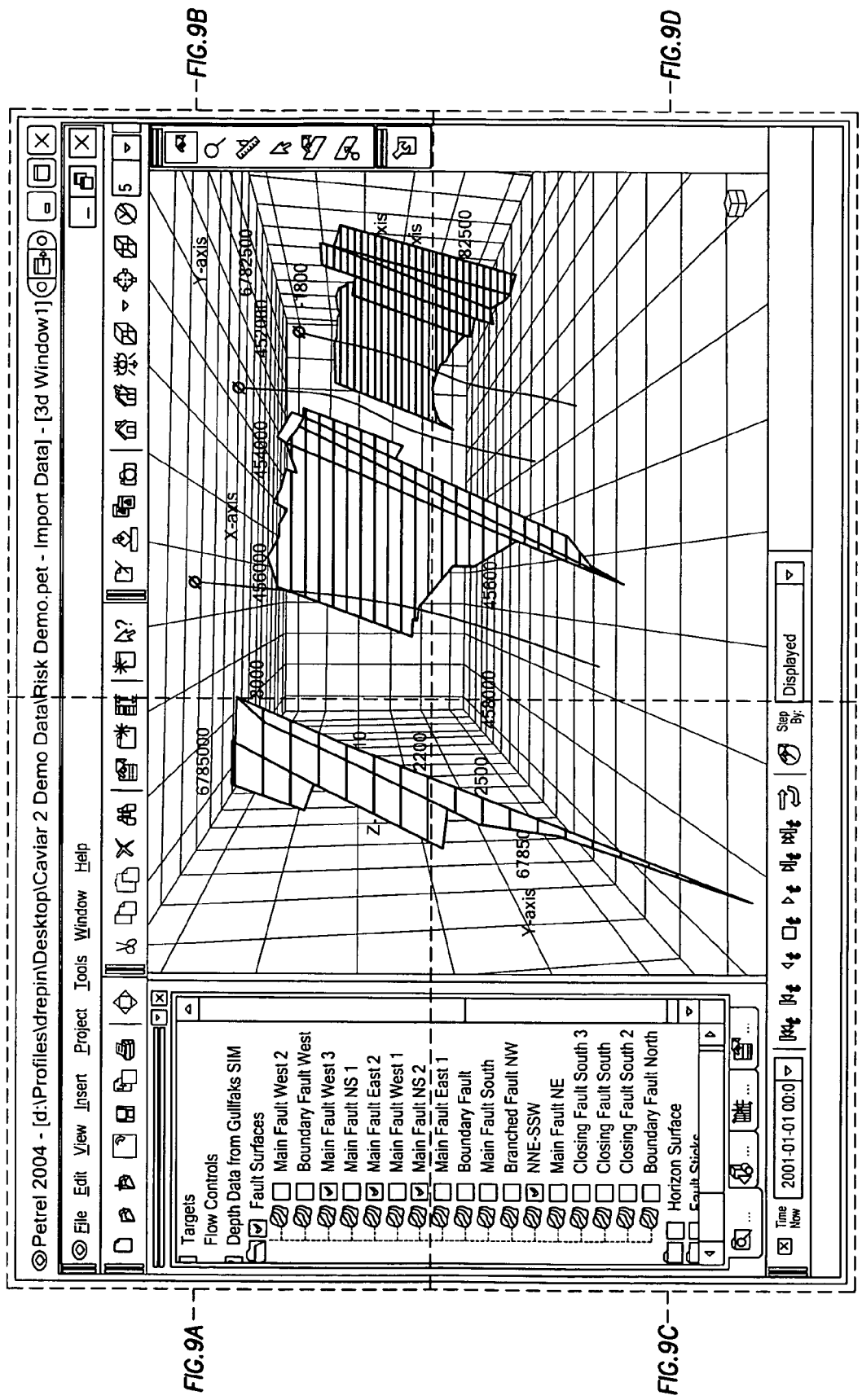
FIG. 9 illustrates an example of a software application display (which is displayed on a computer system's recorder or display device) wherein, when a user selects a fault, the fault is highlighted in the application Data Explorer Tree, but not in the application 3D window, and, as a result, it is impossible to know which fault was selected just by looking in the 3D window.
Figure 9A:
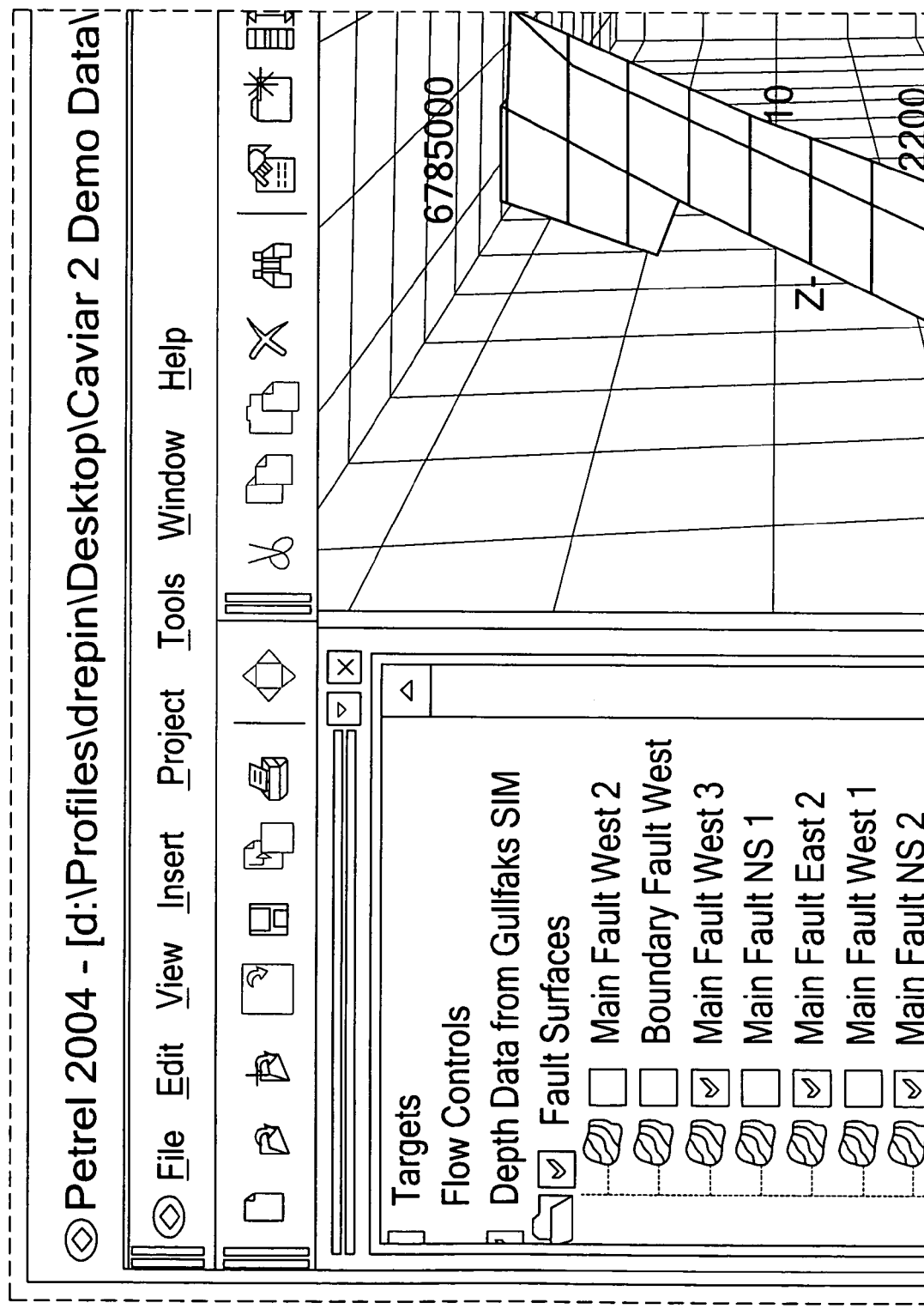
Figure 9B:
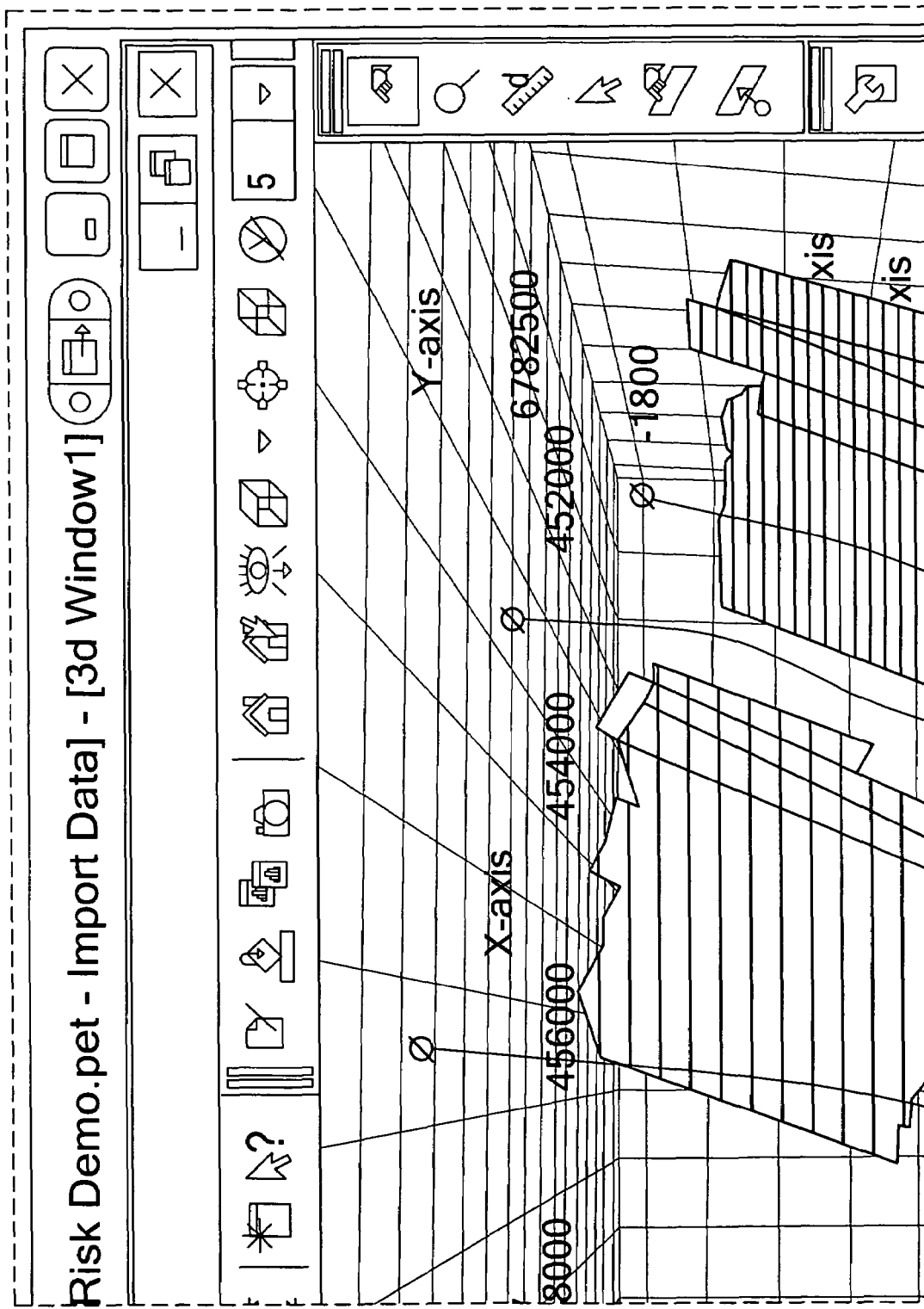
Figure 9C:
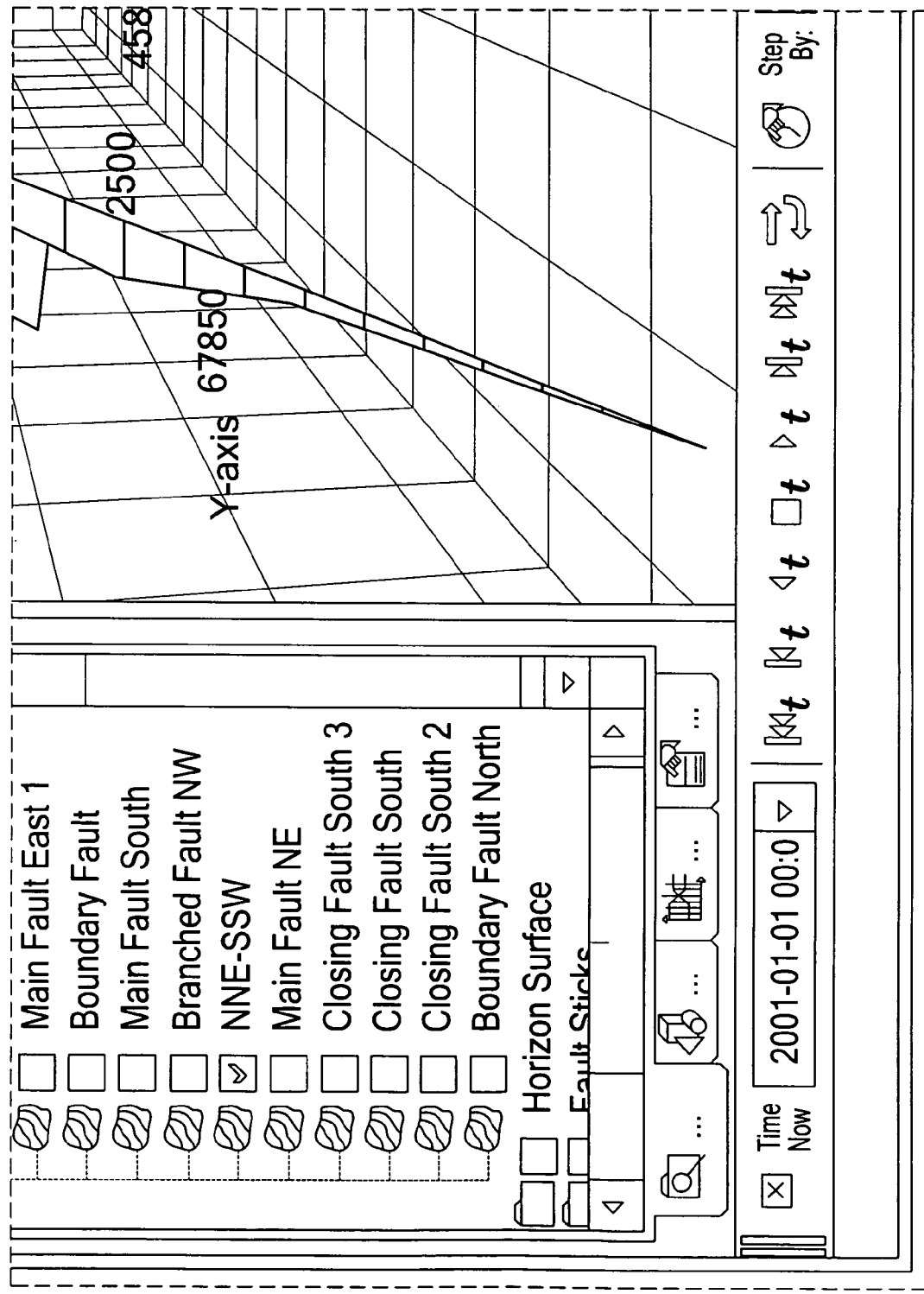
Figure 9D:
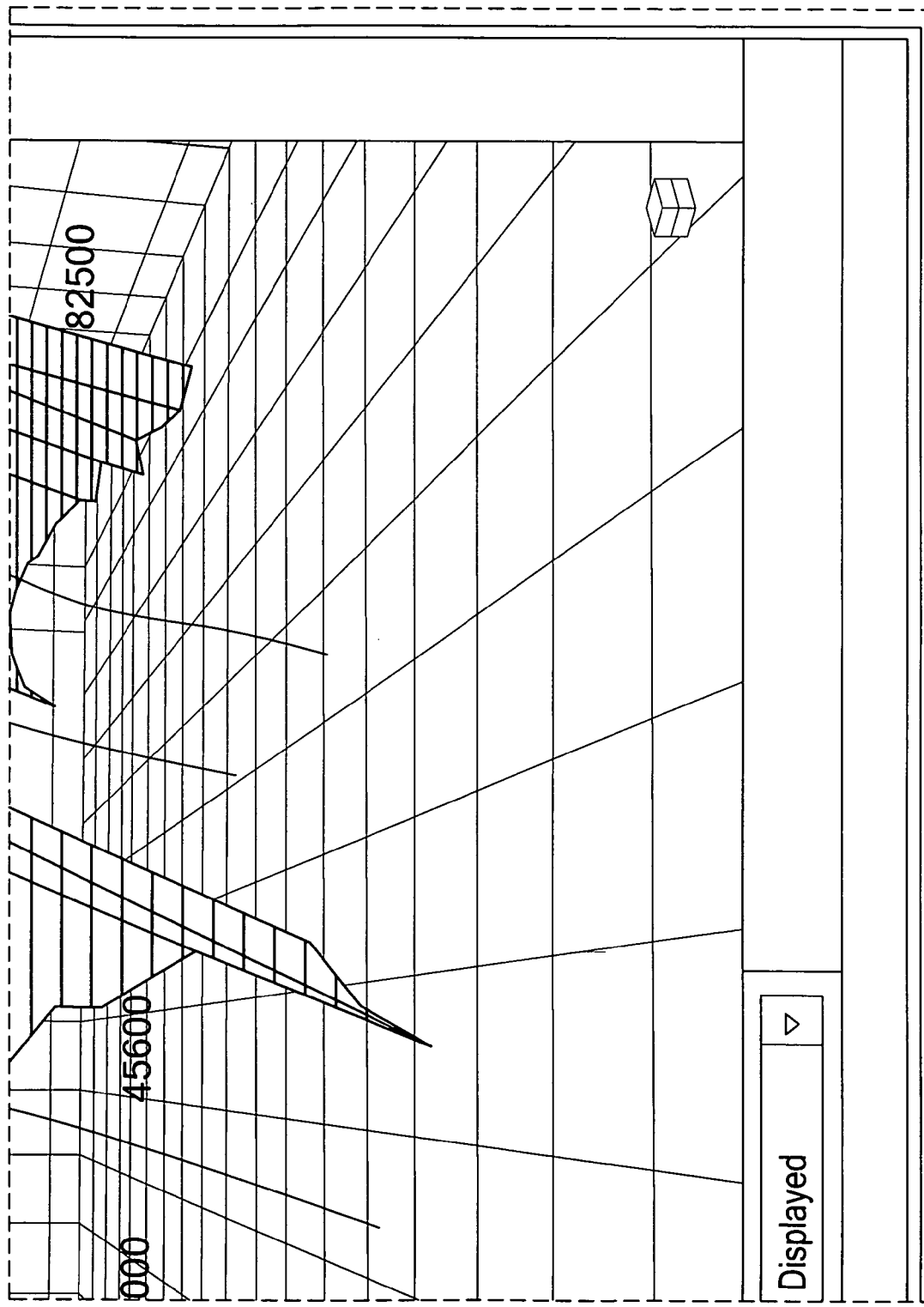

Referring to FIG. 9, an example of a prior art software application display (which is displayed on a computer system's recorder or display device) is illustrated wherein, when a user selects a fault, the fault is highlighted in the application Data Explorer Tree, but not in the application 3D window, and, as a result, it is impossible to know which fault was selected merely by looking in the 3D window.

In FIG. 9, in most of 3D visualization applications, the user must select an object (e.g., a well, a horizon, a fault, etc.) in order to perform some operation on it. Usually, the selection is done via a dialog or in an application data tree and the selected object is highlighted in those Graphical User Interface (GUI) elements. In most cases, however, the selected object is not highlighted or distinguished in some other way in the 3D window of that application. For example, in FIG. 9, when a 'Petrel' user selects a fault, as shown in FIG. 9, the fault is highlighted in the Data Explorer Tree, but not in the 3D Window. Moreover, it is impossible to know which fault was selected merely by looking at the 3D window.

Referring to FIG. 10, three software application displays are illustrated involving different object highlight techniques, including the following:

(1) Open Inventor® 'SoBoxHighlightRenderAction' 56,
(2) Open Inventor® 'SoLineHighlightRenderAction' 58, and
(3) a new 'silhouette highlighting' 60 disclosed in this specification that will highlight a selected object in a 3D scene thereby improving the usability and the understandability of an application.

The first two highlighting techniques 56 and 58 as shown in FIG. 10 have been known and are used in computer graphics. The last highlighting technique 60, known as a 'silhouette highlighting' technique 60, is a new highlighting method or technique that is disclosed in this specification with reference to FIGS. 11 through 20 of the drawings.

In FIG. 10, the example shown as 'example' 56 in FIG. 10 involves drawing a bounding box around the selected object. In addition, the example shown as 'example' 58 of FIG. 10 involves displaying the selected object in 'wireframe mode'. However, the example shown as 'example' 60 in FIG. 10, which is disclosed in this specification with reference to FIGS. 11 through 20, represents a new 'silhouette highlighting' technique or method that utilizes both a Central Processing Unit (CPU) 50e and a Graphical Processing Unit (GPU) 50a (of FIG. 8) to draw, at interactive frame rates, an outline of an object in an arbitrary three-dimensional scene.

As a result, a new method or technique is disclosed that utilizes a modern Graphical Processing Unit (GPU) 50a in addition to a traditional Central Processing Unit (CPU) 50e to produce much more visually appealing and robust selection highlight, such as the 'silhouette highlighting' 60 of FIG. 10 which is shown again in FIG. 20. Variations of the proposed 'silhouettte highlighting' technique 60 of FIG. 10 can be used to create: (1) a simple outline of the visible parts of the selected object; or (2) outline the whole objected with special rendering style used to highlight hidden object parts; or (3) create an aura-like glow highlighting the selected object. For example, adding a 'silhouette highlighting' to a selected object in a 'Petrel' 3D Window will allow the user to immediately visually recognize it (as shown in FIG. 20).

Figure 11:
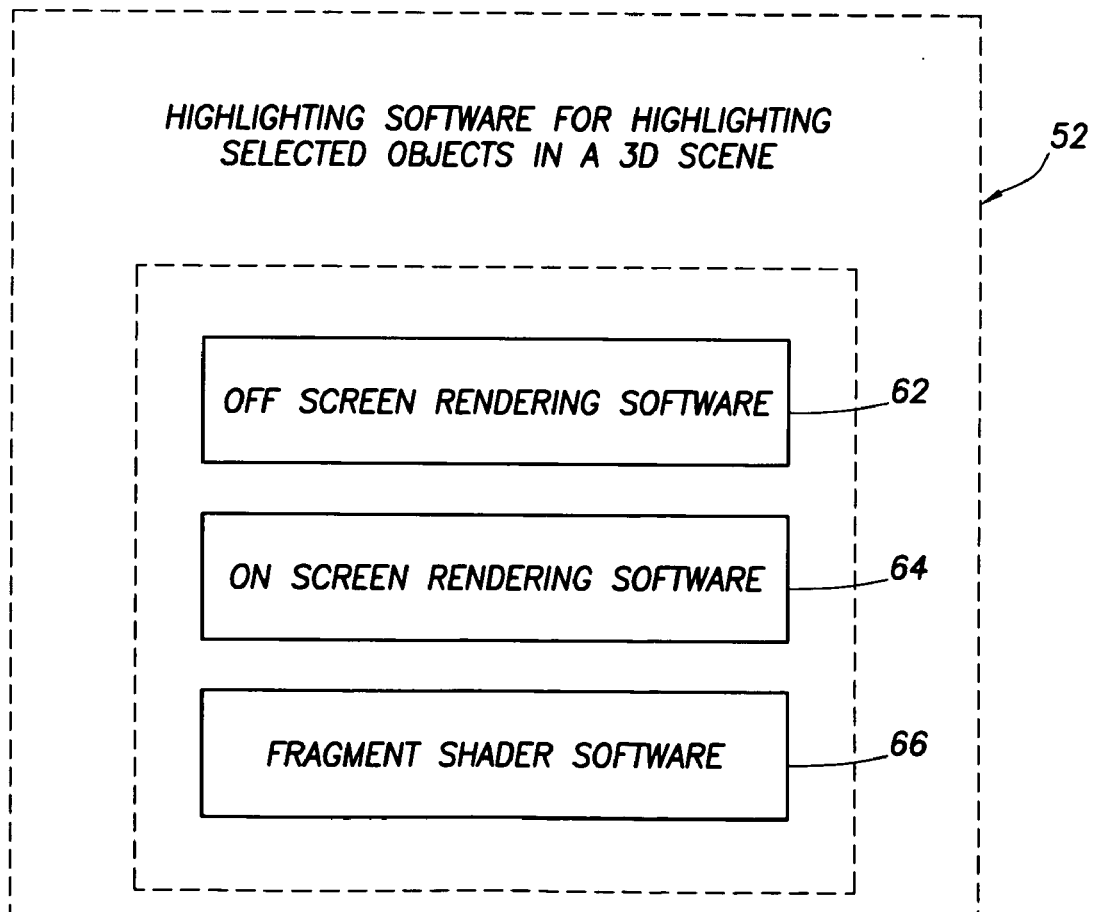
FIGS. 11 and 12 illustrate flowcharts or block diagrams showing a detailed construction and a functional operation of the 'Highlighting Software for Highlighting Selected Objects in a 3D Scene' of FIG. 8, which practices the 'silhouette highlighting' method or technique, as shown in the 'third display' 60 in FIG. 10, that is stored in the workstation or other computer system of FIG. 8.
Figure 12:
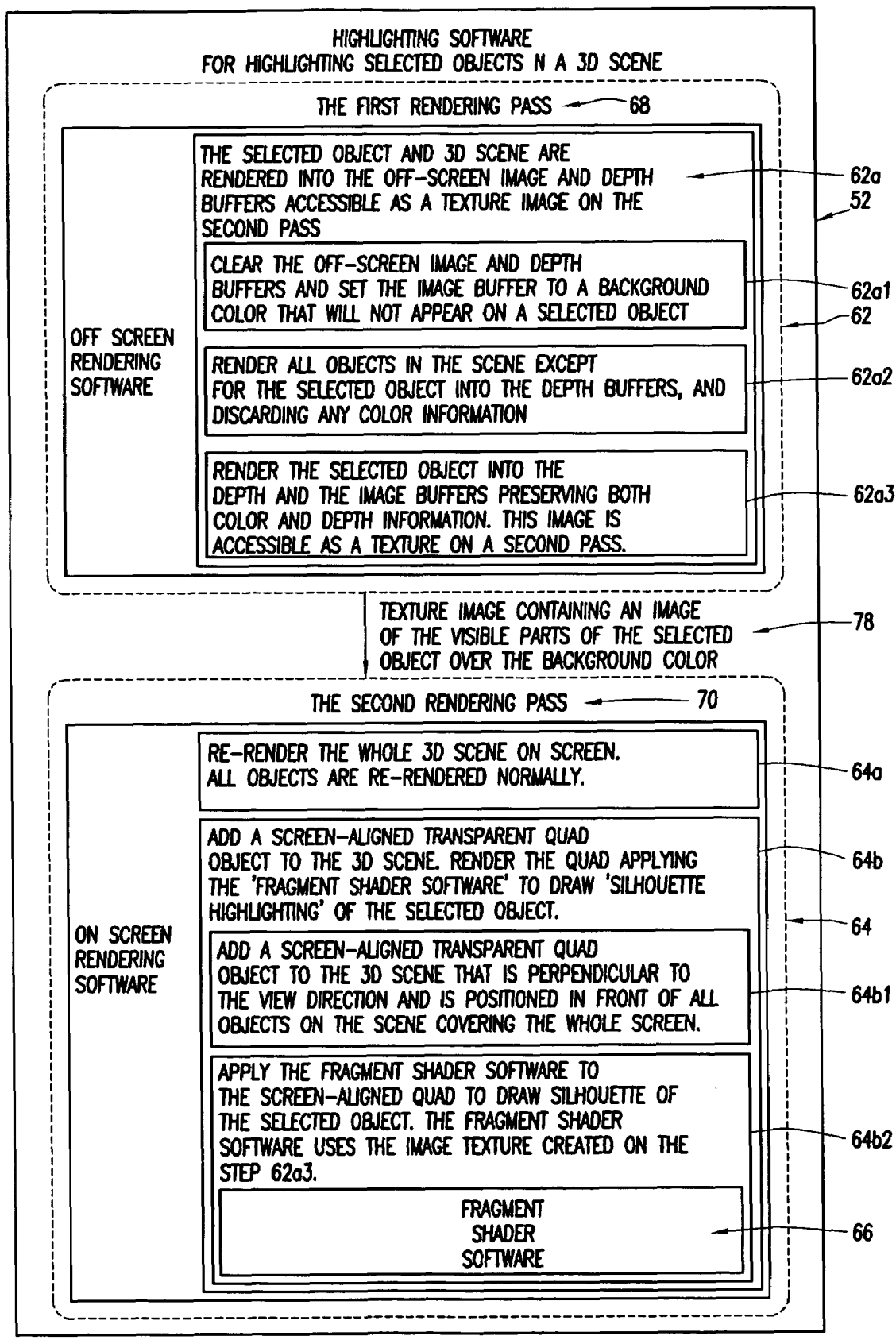

The novel 'silhouette highlighting' method or technique disclosed in this specification, with reference to FIGS. 11 through 20 of the drawings, uses a 'two-pass rendering' method (as shown in FIGS. 11 and 12). During the first pass, the selected object and the rest of the 3D scene are rendered off-screen into a texture using any of the industry-standard methods (for example 'pBuffer' or 'Frame Buffer Object' OpenGL extensions can be used). The order of the rendering and the information rendered into the off-screen texture is also disclosed in this specification. During the second pass, the scene is rendered normally; however, a screen-aligned transparent quad object is added to the 3D scene and a 'fragment shader' software, that is executed by the GPU 50*a*, is employed to draw a 'silhouette highlighting' silhouette of the selected object on top of the quad while using the texture image created in the first pass as data source.

Examples of rendering software include: (1) U.S. Pat. No. 6,304,266 B1 to Li entitled "Method and Apparatus for Volume Rendering", and (2) U.S. Pat. No. 6,940,507 B2 to Repin et al, entitled "Method and Apparatus for Visualization of 3D Voxel Data Using Lit Opacity Volumes with Shading". The disclosures in the U.S. Pat. No. 6,304,266 B1 patent and the U.S. Pat. No. 6,940,507 B2 patent are incorporated by reference into the specification of this application.

Referring to FIG. 11, a construction of the 'Highlighting Software for Highlighting Selected Objects in a 3D Scene' 52 that is stored in the memory 50*c* of the computer system 50 of FIG. 8 is illustrated. The 'Highlighting Software for Highlighting Selected Objects in a 3D Scene' 52 of FIG. 8 includes three types of software:

(1) an 'Off Screen Rendering Software' 62,
(2) an 'On Screen Rendering Software' 64, and
(3) a 'Fragment Shader Software' 66.

Recall that the 'silhouette highlighting' method or technique (shown as display 60 in FIG. 10 and in FIG. 20) disclosed in this specification uses a two-pass rendering method (as shown in FIGS. 11 and 12).

Referring to FIG. 12, a more detailed construction of the 'Highlighting Software for Highlighting Selected Objects in a 3D Scene' 52 of FIGS. 8 and 11, including the 'Off Screen Rendering Software' 62 and the 'On Screen Rendering Software' 64 of FIG. 11, is illustrated.

In FIG. 12, on a first rendering pass 68, the 'Off Screen Rendering Software' 62 will perform the following method or function, which is illustrated as step 62*a* of FIG. 12: the selected object and 3D scene are rendered into the off-screen image and depth buffers accessible as a texture image on the second pass.

However, step 62*a* of FIG. 12 (i.e., the selected object and 3D scene are rendered into the off-screen image and depth buffers accessible as a texture image on the second pass) further includes the following sub-steps 62*a*1, 62*a*2, and 62*a*3 as shown in FIG. 12, as follows:

(1) Clear the off-screen image and depth buffers and set the image buffer to a background color that will not appear on a selected object, step 62*a*1 in FIG. 12,
(2) Render all objects in the scene, except for the selected object, into the depth buffers, and discard any color information, step 62*a*2 of FIG. 12, and
(3) Render the selected object into the depth and the image buffers while preserving both color and depth information; this image is accessible as a texture on a second pass, step 62*a*3 of FIG. 12.

In FIG. 12, when the execution of step 62*a*3 by the GPU 50*a* and the CPU 50*e* of the computer system of FIG. 8 is complete, a 'texture image containing an image of the visible parts of the selected object over the background color' 78 is passed to the On Screen Rendering software 64 for use during the second rendering pass 70.

In FIG. 12, on a second rendering pass 70, the 'On Screen Rendering Software' 64 will perform the following method or function:

(1) Re-render the whole 3D scene on screen; all objects are re-rendered normally, step 64*a* of FIG. 12, and
(2) Add a screen-aligned transparent quad object to the 3D scene; render the quad, while applying a 'Fragment Shader Software' 66, to draw 'silhouette highlighting' of the selected object, step 64*b* of FIG. 12.

However, the above referenced method or function illustrated as step 64*b* in FIG. 12 (i.e., Add a screen-aligned transparent quad object to the 3D scene; render the quad, while applying a 'Fragment Shader Software' 28, to draw 'silhouette highlighting' of the selected object) is further practiced or implemented by practicing the following sub-steps 64*b*1 and 64*b*2 as shown in FIG. 12, as follows:

(1) Add a screen-aligned transparent quad object to the 3D scene that is perpendicular to the view direction and is positioned in front of all objects on the scene covering the whole screen, step 64*b*1 of FIG. 12, and
(2) Apply the 'Fragment Shader Software' 66 of FIG. 12 to the screen-aligned quad to draw a 'silhouette' of the selected object; the Fragment Shader Software 66 uses the image texture created during step 62*a*3 of FIG. 12, step 64*b*2 of FIG. 12.

In FIGS. 11 and 12, during the first rendering pass 68, the selected object and the rest of the scene are rendered off-screen into a texture [step 62*a* of FIG. 12] by using the 'Off Screen Rendering Software' 62. For rendering into a texture, any of industry-standard methods (for example 'pBuffer' or 'Frame Buffer Object' OpenGL extensions) can be used; however, the order of the rendering in addition to the information rendered into the off-screen texture [steps 62*a*1, 62*a*2, and 62*a*3 in FIG. 12] are discussed below in this specification.

In FIGS. 11 and 12, first, the off-screen image and depth buffers are cleared and the image buffer is set to a background color that will not appear on the selected object [step 62*a*1 of FIG. 12]. For example, transparent black [red=0, green=0, blue=0, alpha=0] can be used. Then, all the objects on the 3D scene, except the selected object, are rendered into the depth buffer, and the color information is discarded [step 62*a*2 of FIG. 12]. Finally, the selected object is rendered into the depth and the image buffers while preserving both color and depth information [step 62*a*3 of FIG. 12]. At the end, the image buffer will contain an image of the visible parts of the selected object over the background color and it is made accessible to the 'Fragment Shader Software' 66 on the second pass.

In FIGS. 11 and 12, during the second rendering pass 70, the 'On Screen Rendering Software' 64 is used to re-render on screen the whole scene normally [step 64*a* in FIG. 12] and to add a screen-aligned transparent quad objects to the 3D scene and render the quad applying a 'Fragment Shader Software' 66 (that is executed by the GPU 50*a*) to draw a 'silhouette highlighting' of the selected object in a 3D scene [step 64*b* of FIG. 12].

In FIGS. 11 and 12, a screen-aligned quad object added to a 3D scene is drawn perpendicular to the view direction and is positioned in front of all objects on the scene (step 64*b*1 in FIG. 12). When we render a screen-aligned quad object added to a 3D scene, we apply the 'Fragment Shader Software' 66 to the quad [step 64*b*2 of FIG. 12]. The 'Fragment Shader Software' 66 uses the image texture that was created in response to the execution of step 62*a*3 of FIG. 12 during the first rendering pass 68.

In FIGS. 11 and 12, when the 'Fragment Shader Program' 66 draws a pixel of the screen-aligned quad, it tests a first condition whether the corresponding pixel of the off screen image is of the background color, and a second condition whether the corresponding pixel of the off screen image borders an object image pixel. If both the first and the second conditions are met, the currently drawn pixel belongs to the selected object's outlining silhouette and the 'Fragment Shader Software' 66 draws the pixel using the silhouette color. If at least one of the conditions (i.e., if either the first condition or the second condition) is not met, the pixel is drawn transparent to allow the viewer to see the rest of the scene.

Referring to FIGS. 13 through 19, each of the steps 62a1, 62a2, and 62a3 associated with the Off Screen Rendering software 62 of FIG. 12, and each of the steps 64a, 64b, 64b1 and 64b2 associated with the On Screen Rendering software 64 of FIG. 12 will be discussed in the following paragraphs with reference to FIGS. 13 through 19 of the drawings.

Figure 13:
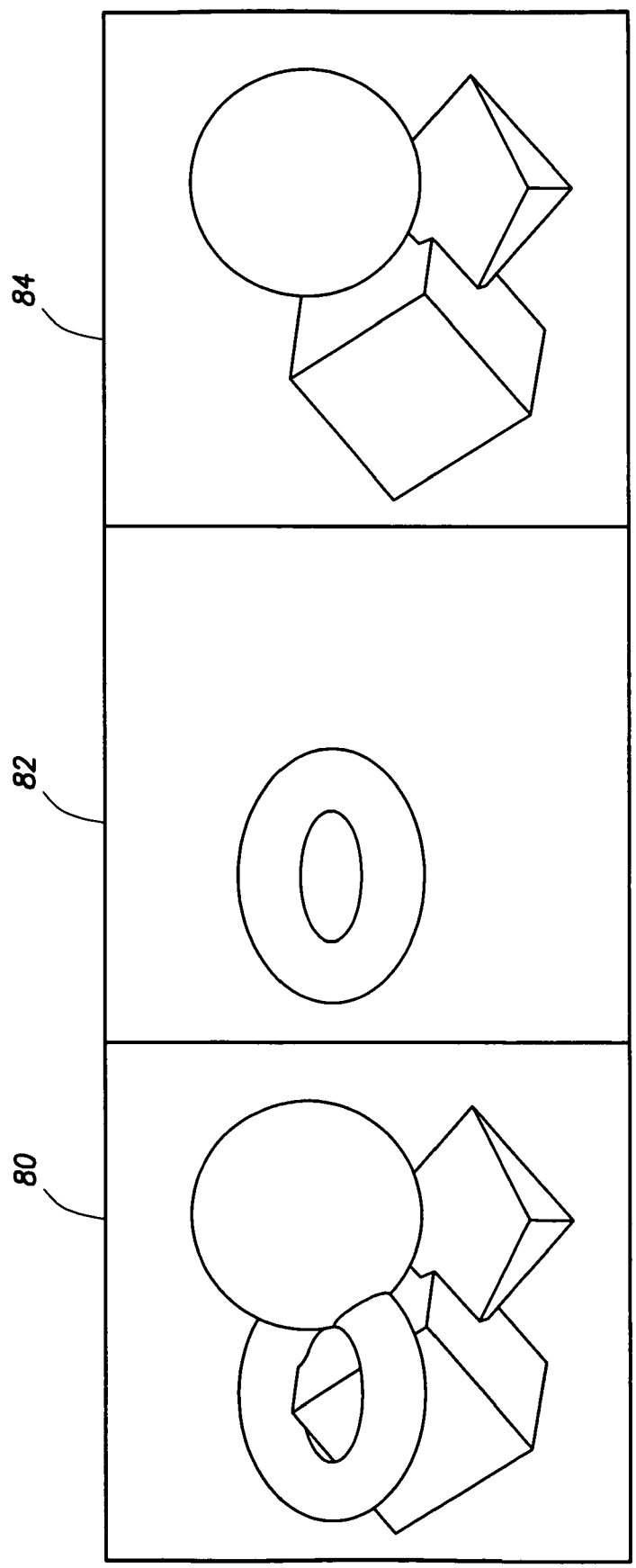

In FIG. 13, this figure includes FIGS. 80, 82, and 84. FIG. 80 (on the left side of FIG. 13) shows the 'whole scene'. FIG. 82 (in the middle of FIG. 13) shows only the object that has been selected (i.e., the 'selected object'). FIG. 84 (on the right side of FIG. 13) shows the remaining parts of the 'whole scene' of FIG. 80 without the 'selected object' of FIG. 82.

In FIG. 14, an 'off screen image buffer' 86 and an 'off screen depth buffer' 88 is illustrated. In FIG. 14, during the first rendering pass 68 associated with the execution of the Off Screen Rendering software 62 of FIG. 12, in step 62a1 of FIG. 12, clear the off screen image and depth buffers 86 and 88 (as shown in FIG. 14) and set the 'off screen image buffer' 86 to a background color that will not appear on the 'selected object' of FIG. 82. In FIG. 14, the 'off screen image buffer' 86 and the 'off screen depth buffer' 88 have been cleared.

In FIG. 15, in step 62a2 of FIG. 12, render all objects in the scene, except for the 'selected object' of FIG. 82, into the depth buffers 88 of FIG. 14 and discard any color information. In FIG. 15, note image 90. In FIG. 15, all objects in the 'whole scene' of FIG. 80, except for the 'selected object' of FIG. 82, have been rendered into the depth buffer 88 of FIG. 14 and all color information (in the depth buffer 88) has been discarded.

Figure 16:
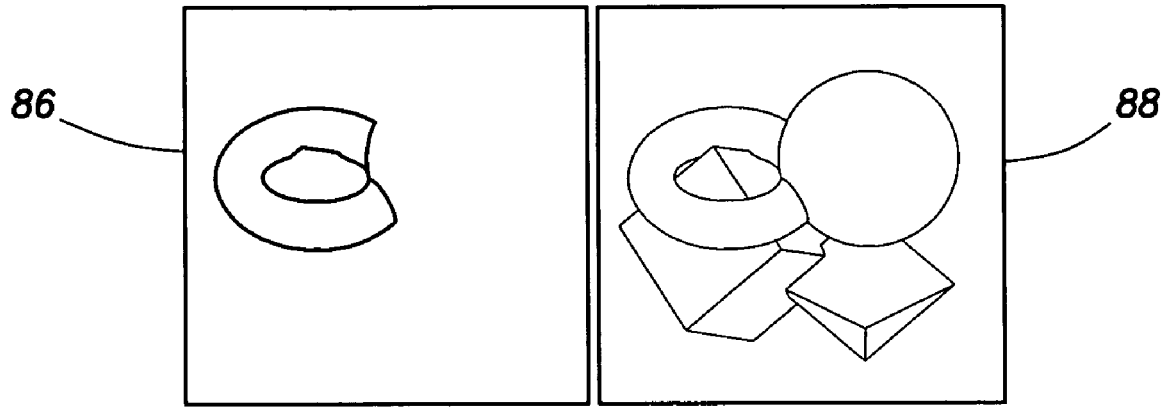

In FIG. 16, in step 62a3 of FIG. 12, starting with the images set forth in the image buffer 86 and the depth buffer 88 of FIG. 15, and noting the image 90 in the depth buffer 88 of FIG. 15, render the 'selected object' of FIG. 82 back into the depth buffer 88 and the image buffer 86 of FIG. 15, while preserving both color and depth information, thereby generating the images shown in the image and depth buffers 86 and 88 of FIG. 16. This image is accessible as a texture on the second pass (see step 78 in FIG. 12).

Figure 17:
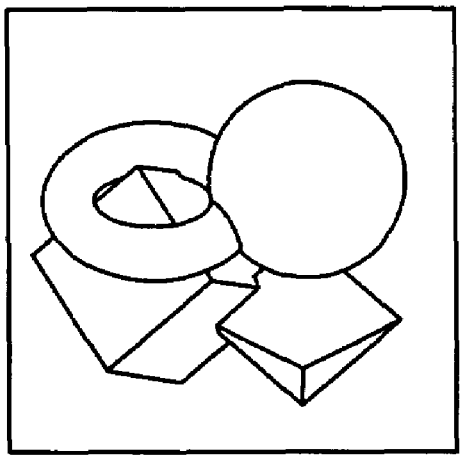

In FIG. 17, during the second rendering pass 70 associated with the execution of the On Screen Rendering software 64 of FIG. 12, in step 64a of FIG. 12, re-render the 'whole 3D scene' of FIG. 80 on-screen. All objects are re-rendered normally.

Figure 18:
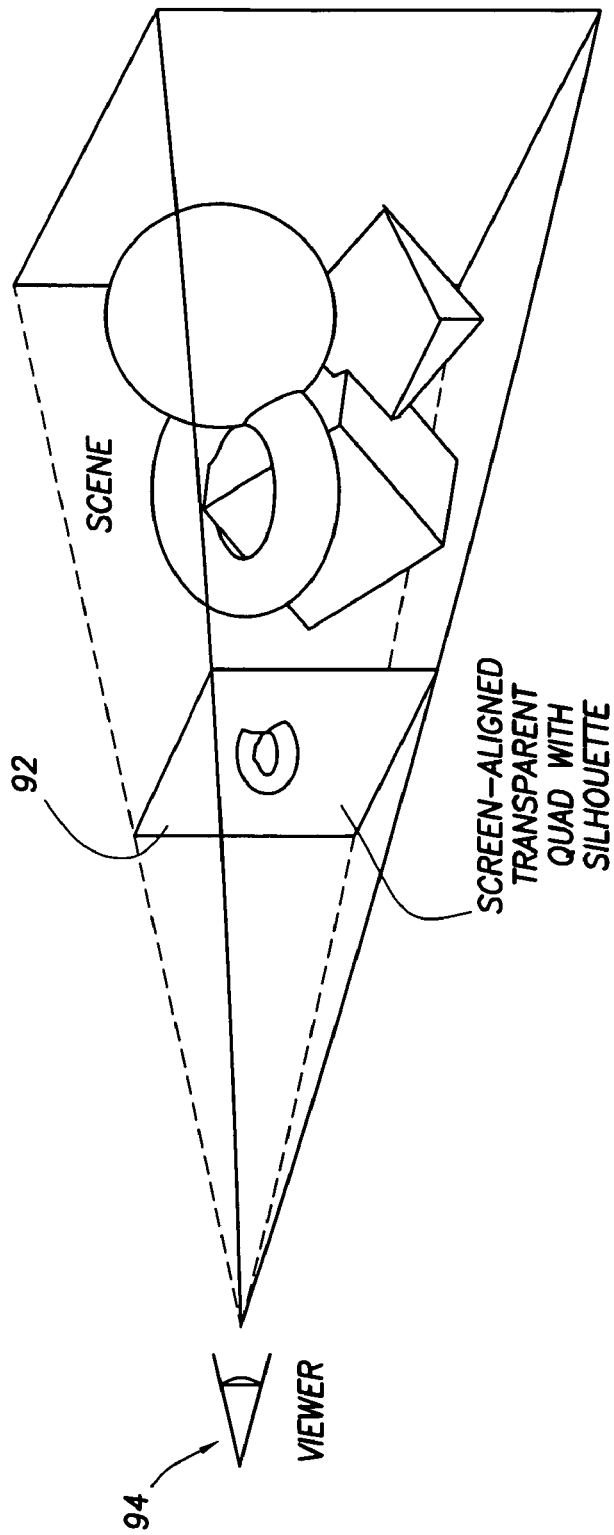

In FIG. 18, in step 64b1, add a 'screen-aligned transparent quad object' 92 to the 3D Scene (which has been re-rendered on-screen during step 64a of FIG. 17) that is perpendicular to the view direction of a viewer 94 and is positioned in front of all objects on the scene covering the whole screen, as shown in FIG. 18. The viewer sees the scene through the quad object 92 and a 'silhouette' is drawn on top of the quad 92.

In FIG. 19, in step 64b2, apply the Fragment Shader Software 66 to the screen-aligned quad 92 of FIG. 18 to draw a 'silhouette' of the 'selected object' of FIG. 82. The Fragment Shader Software 66 uses the image texture created by step 62a3 of FIG. 12. In FIG. 19, the viewer 94 (of FIG. 18) sees the 'selected object' (of FIG. 82) as 'outlined'; see numeral 96 in FIG. 19 and take particular note of the 'outline' 96 which appears around the 'selected object' (of FIG. 82) in FIG. 19.

Referring to FIGS. 10 and 20, referring initially to FIG. 20, when the 'Highlighting Software for Highlighting Selected Objects in a 3D Scene' 52, which is stored in the memory 50c of the computer system 50 of FIG. 8, is executed by the GPU 50a and the CPU 50e, the 'output display' 72 as shown in FIG. 20 is recorded or displayed on the 'Recorder or Display device' 50d of the computer system 50 of FIG. 8. An example of that 'output display' 72 is illustrated in FIG. 20. Another example of that 'output display' is also illustrated in FIG. 10 represented by display number 60. In FIG. 20, the 'output display' 72 includes a 'silhouette highlighting' 74 which is placed around a 'fault' in a 3D scene. The 'silhouette highlighting' 74 will highlight the 'fault' for the benefit of the user/viewer. Recall that, when a user/operator is viewing the 'output display' 72 of FIG. 20 that it is being recorded or displayed on the 'Recorder or Display device' 50d of FIG. 8, that user/operator can easily locate the 'fault' because that 'fault' is being highlighted by the 'silhouette highlighting' 74 in FIG. 20; that is, the 'silhouette highlighting' 74 will actually surround the 'fault' and thereby 'highlight' the fault. In FIG. 10, referring to 'output display' 60, notice the 'silhouette highlighting' 76 which surrounds a 'selected object' in the 'output display' 60 of FIG. 10. The 'silhouette highlighting' 76 in FIG. 10 will enable the user/operator to easily view and analyze the 'selected object' in the 3D scene being shown in the 'output display' 60 of FIG. 10.

Figure 22:
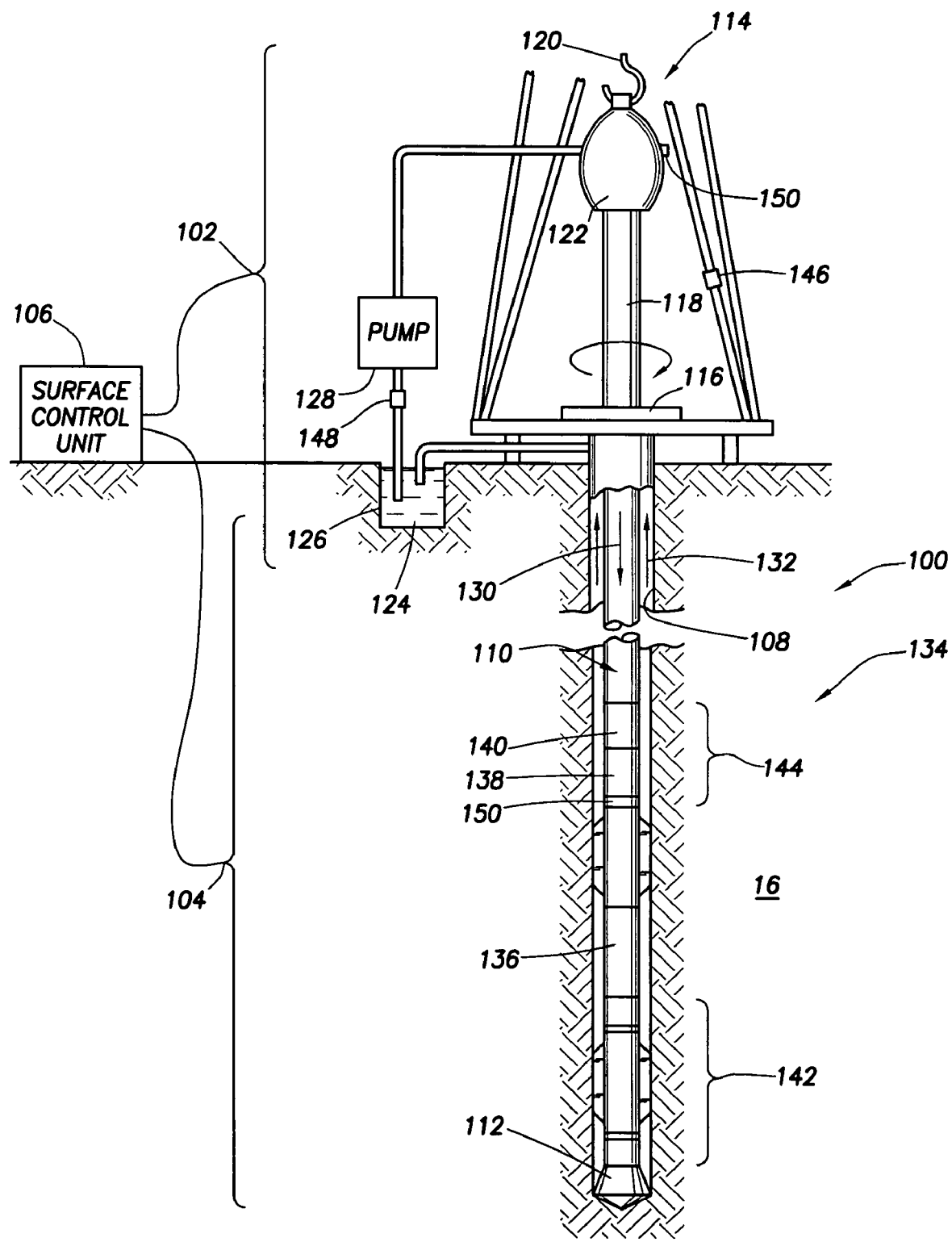
FIG. 22 illustrates a drilling rig situated at the 'particular location' of the Earth formation for producing oil and/or gas from the Earth formation.

Refer to FIGS. 10, 20, and 21, referring initially to FIG. 21, the computer system 50 of FIG. 8 is illustrated. In FIG. 21, the computer system 50 includes the processor 50f, a monitor 50g, a keyboard 50h, and a mouse 50i. In FIG. 21, the 'output display' 60 of FIG. 10 is adapted to be displayed on the monitor 50g. In addition, in FIG. 21, the 'output display' 72 of FIG. 20 is also adapted to be displayed on the monitor 50g of the computer system 50 of FIG. 21. A user/operator sits in front of the computer system monitor 50g, the operator carefully studying the 'output displays' 60 and 72 (of FIGS. 10 and 20) that are being displayed on the monitor 50g of the computer system 50 of FIG. 21. The 'output displays' 60 and 72 may include information pertaining to the Earth formation 16 of FIGS. 1 and 3. The operator studies the 'output displays' 60 and 72 (that are being displayed on the computer system monitor 50g) for the ultimate purpose of finding a 'particular location' in the Earth formation 16 of FIGS. 1 and 3 where oil and/or gas may be potentially located. In response to the studying (by the operator) of the 'output displays' 60 and 72 being displayed on computer system monitor 50g, when the operator finds the 'particular location' in the Earth formation 16 where oil and/or gas is potentially located, a drilling rig (such as the drilling rig of FIG. 22) may be subsequently set up above the 'particular location' in the Earth formation 16 where the oil and/or gas is potentially located, the drilling rig (of FIG. 22) attempting to pump or extract the oil and/or gas from the 'particular location' in the Earth formation 16 for the ultimate use by purchasers of the oil and/or gas. Refer now to FIG. 22 for one detailed construction of that drilling rig.

Referring to FIG. 22, a drilling rig 100 is illustrated, the drilling rig 100 being situated above the 'particular location' in the Earth formation 16 where the oil and/or gas is potentially located. Recall that the 'particular location' in the formation 16 is located by the operator of workstation 50 of FIG. 21 in response to a study by the operator of the 'output displays' 60 and 72 that are being presented to the operator on the computer system monitor 50g of FIG. 21.

In FIG. 22, one embodiment of a drilling rig includes a surface system 102, a downhole system 104, and a surface control unit 106. In the illustrated embodiment, a borehole 108 is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs. The downhole system 104 includes a drill string 110 suspended within the borehole 108 with a drill bit 112 at its lower end. The surface system 102 includes the land-based platform and derrick assembly 114 positioned over the borehole 108 penetrating a subsurface formation 16. The assembly 114 includes a rotary table 116, kelly 118, hook 120, and rotary swivel 122. The drill string 110 is rotated by the rotary table 116, energized by means not shown, which engages the kelly 118 at the upper end of the drill string. The drill string 110 is suspended from a hook 120, attached to a traveling block (also not shown), through the kelly 118 and a rotary swivel 122 which permits rotation of the drill string relative to the hook. The surface system further includes drilling fluid or mud 124 stored in a pit 126 formed at the well site. A pump 128 delivers the drilling fluid 124 to the interior of the drill string 110 via a port in the swivel 122, inducing the drilling fluid to flow downwardly through the drill string 110 as indicated by the directional arrow 130. The drilling fluid exits the drill string 110 via ports in the drill bit 112, and then circulates upwardly through the region between the outside of the drill string and the wall of the borehole, called the annulus, as indicated by the directional arrows 132. In this manner, the drilling fluid lubricates the drill bit 112 and carries formation cuttings up to the surface as it is returned to the pit 126 for recirculation. The drill string 110 further includes a bottom hole assembly (BHA), generally referred to as 134, near the drill bit 112 (in other words, within several drill collar lengths from the drill bit). The bottom hole assembly includes capabilities for measuring, processing, and storing information, as well as communicating with the surface. The BHA 134 further includes drill collars 136, 138, and 140 for performing various other measurement functions. Drill collar 136 of BHA 134 includes an apparatus 142 for determining and communicating one or more properties of the formation 16 surrounding borehole 108, such as formation resistivity (or conductivity), natural radiation, density (gamma ray or neutron), and pore pressure. Drill collar 138 houses a measurement-while-drilling (MWD) tool. The MWD tool further includes an apparatus for generating electrical power to the downhole system. While a mud pulse system is depicted with a generator powered by the flow of the drilling fluid 124 that flows through the drill string 110 and the MWD drill collar 140, other power and/or battery systems may be employed. Sensors are located about the wellsite to collect data, preferably in real time, concerning the operation of the wellsite, as well as conditions at the wellsite. For example, monitors, such as cameras 146, may be provided to provide pictures of the operation. Surface sensors or gauges 148 are disposed about the surface systems to provide information about the surface unit, such as standpipe pressure, hookload, depth, surface torque, rotary rpm, among others. Downhole sensors or gauges 150 are disposed about the drilling tool and/or wellbore to provide information about downhole conditions, such as wellbore pressure, weight on bit, torque on bit, direction, inclination, collar rpm, tool temperature, annular temperature and toolface, among others. The information collected by the sensors and cameras is conveyed to the surface system, the downhole system and/or the surface control unit. The MWD tool 140 includes a communication subassembly 144 that communicates with the surface system. The communication subassembly 144 is adapted to send signals to and receive signals from the surface using mud pulse telemetry. The communication subassembly may include, for example, a transmitter that generates a signal, such as an acoustic or electromagnetic signal, which is representative of the measured drilling parameters. The generated signal is received at the surface by transducers, represented by reference numeral 150, that convert the received acoustical signals to electronic signals for further processing, storage, encryption and use according to conventional methods and systems. Communication between the downhole and surface systems is depicted as being mud pulse telemetry, such as the one described in U.S. Pat. No. 5,517,464, assigned to the assignee of the present invention. It will be appreciated by one of skill in the art that a variety of telemetry systems may be employed, such as wired drill pipe, electromagnetic or other known telemetry systems.

A functional description of the operation of the 'Highlighting Software for Highlighting Selected Objects in a 3D Scene' 52 of FIG. 8 will be set forth in the following paragraphs with reference to FIGS. 1 through 22 of the drawings.

In FIGS. 1 through 7, a well log output record 22 and a reduced seismic data output record 46 are generated, the well log output record 22 and the reduced seismic data output record 46 being provided as 'input data' to the workstation or other computer system 50 shown in FIGS. 7 and 8. In FIG. 8, the Central Processing Unit (CPU) 50e and the Graphical Processing Unit (GPU) 50a will, in response to the above referenced 'input data', execute the 'Highlighting Software' 52 which is stored in the memory 50c of the computer system 50 and, responsive thereto, an 'output display' will be recorded or displayed on the 'Recorder or Display device' 50d in FIG. 8. During that execution of the 'Highlighting Software' 52 by CPU 50e and GPU 50a, the CPU 50e and the GPU 50a will actually execute the 'Off Screen Rendering Software' 62 and the 'On Screen Rendering Software' 64, while the GPU 50a will also execute the 'Fragment Shader Software' 66 shown in FIG. 11. When executing the 'Off Screen Rendering Software' 62, the CPU 50e and GPU 50a will, on the first rendering pass, render the selected object and the whole scene into the off-screen image and depth buffers, as indicated by the steps 62a1 through 62a3 in FIG. 12. Then, when executing the 'On Screen Rendering Software' 64, the CPU 50e and the GPU 50a will, on the second rendering pass, re-render the whole 3D scene again normally, as indicated by the step 64a in FIG. 12. They will also render, applying the 'Fragment Shader Software' 66, a screen-aligned transparent quad object added to the 3D scene as indicated by the steps 64b1 and 64b2 in FIG. 12. The GPU 50a will, on the second rendering pass, also execute 'Fragment Shader Program' 66 as described above. As a result of the execution of the 'Highlighting Software' 52 by CPU 50e and GPU 50a of FIG. 8, an 'output display' is recorded or generated on the 'Recorder or Display device' 50d of FIG. 8. One example of that 'output display' is illustrated in FIG. 10 by 'output display' 60. Note the 'silhouette highlighting' 76 which surrounds the 'selected object' in the 3D scene. Another example of that 'output display' is illustrated in FIG. 20 by 'output display' 72. In FIG. 20, in 'output display' 72, the 'silhouette highlighting' 74 actually surrounds and 'highlights' the 'fault' being shown in the 3D scene in that 'output display' 72. The 'output display' 60 of FIG. 10 and the 'output display' 72 of FIG. 20 are adapted to be displayed on the computer system monitor 50g associated with the computer system 50 shown in FIG. 21. A user/operator can then carefully study the 'output displays' 60 and 72 being presented on the computer system monitor 50g of FIG. 21 in order to find a 'particular location' in an Earth formation 16 (of FIGS. 1 and 3) where oil and/or gas is potentially located. When the 'particular location' in the Earth formation 16 is found by the operator during the operator's careful study of 'output displays' 60 and 72 being displayed on monitor 50g of FIG. 21, a drilling rig, such as the drilling rig 100 shown in FIG. 22, can be placed above the 'particular location' in the Earth formation 16 in order to pump or extract the oil and/or gas from the Earth formation 16.

The above-described technique can also be modified to outline the whole object to reveal its true shape. The parts of the selected object that are obscured by other objects on the scene can be drawn semi-transparent or outlined or in different color.

The above description of the 'Highlighting Software' 52 of FIG. 8 being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

I claim:

1. A method for extracting underground deposits of hydrocarbon from a formation, comprising:
    generating input data including a well log output record and a seismic data output record;
    receiving said input data and generating an output display including a silhouette highlight of a selected object, the step of generating said output display including,
    rendering a selected object and a 3D scene into off screen image and depth buffers and generating a texture image containing an image of a set of visible parts of the selected object over a background color,
    in response to said texture image, re-rendering a whole 3D scene on screen where all objects are re-rendered normally; and
    adding a screen-aligned transparent quad object to the 3D scene and rendering the quad by drawing a silhouette highlight of the selected object;
    determining, from said output display, a particular location in the formation where said underground deposits of hydrocarbon are located; and
    extracting said underground deposits of hydrocarbon from said particular location in the formation.

2. The method of claim 1, wherein the rendering step of rendering a selected object and a 3D scene into off screen image and depth buffers comprises:
    clearing the off screen image and depth buffers and set the image buffer to a background color that will not appear on a selected object.

3. The method of claim 2, wherein the rendering step of rendering a selected object and a 3D scene into off screen image and depth buffers further comprises:
    rendering all objects in the scene except for the selected object into the depth buffers and discarding any color information.

4. The method of claim 3, wherein the rendering step of rendering a selected object and a 3D scene into off screen image and depth buffers further comprises:
    rendering the selected object into the depth and the image buffers preserving both color and depth information and generating said texture image containing an image of a set of visible parts of the selected object over a background color.

5. The method of claim 1, wherein the adding step of adding a screen-aligned transparent quad object to the 3D scene and rendering the quad by drawing a silhouette highlight of the selected object comprises:
    adding a screen aligned transparent quad object to the 3D scene that is perpendicular to a view direction and is positioned in front of all objects on the scene covering the whole screen.

6. The method of claim 5, wherein the adding step of adding a screen-aligned transparent quad object to the 3D scene and rendering the quad by drawing a silhouette highlight of the selected object further comprises:
    drawing a silhouette of the selected object in response to said texture image containing an image of a set of visible parts of the selected object over a background color.

7. A system adapted for extracting underground deposits of hydrocarbon from a formation, comprising:
    first apparatus adapted for generating input data including a well log output record and a seismic data output record;
    second apparatus adapted for receiving said input data and generating an output display including a silhouette highlight of a selected object, the second apparatus including,
    apparatus adapted for rendering a selected object and a 3D scene into off screen image and depth buffers and generating a texture image containing an image of a set of visible parts of the selected object over a background color,
    apparatus, responsive to said texture image, adapted for re-rendering a whole 3D scene on screen where all objects are re-rendered normally; and
    apparatus adapted for adding a screen-aligned transparent quad object to the 3D scene and rendering the quad by drawing a silhouette highlight of the selected object;
    means for determining, from said output display, a particular location in the formation where said underground deposits of hydrocarbon are located; and
    means for extracting said underground deposits of hydrocarbon from said particular location in the formation.

8. The system of claim 7, wherein the apparatus adapted for rendering a selected object and a 3D scene into off screen image and depth buffers comprises:
    apparatus adapted for clearing the off screen image and depth buffers and set the image buffer to a background color that will not appear on a selected object.

9. The system of claim 8, wherein the apparatus adapted for rendering a selected object and a 3D scene into off screen image and depth buffers further comprises:
    apparatus adapted for rendering all objects in the scene except for the selected object into the depth buffers and discarding any color information.

10. The system of claim 9, wherein the apparatus adapted for rendering a selected object and a 3D scene into off screen image and depth buffers further comprises:
    apparatus adapted for rendering the selected object into the depth and the image buffers preserving both color and depth information and generating said texture image containing an image of a set of visible parts of the selected object over a background color.

11. The system of claim 1, wherein the apparatus adapted for adding a screen-aligned transparent quad object to the 3D scene and rendering the quad by drawing a silhouette highlight of the selected object comprises:
    apparatus adapted for adding a screen aligned transparent quad object to the 3D scene that is perpendicular to a view direction and is positioned in front of all objects on the scene covering the whole screen.

12. The system of claim 11, wherein the apparatus adapted for adding a screen-aligned transparent quad object to the 3D scene and rendering the quad by drawing a silhouette highlight of the selected object further comprises:
    apparatus adapted for drawing a silhouette of the selected object in response to said texture image containing an image of a set of visible parts of the selected object over a background color.

13. A tangible computer storage medium having a set of computer-readable instructions residing thereon that, when executed by a computer system, perform acts comprising:

receiving input data including a well log output record and a seismic data output record;

generating an output display including a silhouette highlight of a selected object, the step of generating said output display including, rendering a selected object and a 3D scene into off screen image and depth buffers and generating a texture image containing an image of a set of visible parts of the selected object over a background color, in response to said texture image, re-rendering a whole 3D scene on screen where all objects are re-rendered normally; and adding a screen-aligned transparent quad object to the 3D scene and rendering the quad by drawing a silhouette highlight of the selected object.

14. The tangible computer storage medium of claim 13 having a set of computer-readable instructions that, when executed, perform acts further comprising:

clearing the off screen image and depth buffers and setting the image buffer to a background color that will not appear on a selected object.

15. The tangible computer storage medium of claim 14 having a set of computer-readable instructions that, when executed, perform acts further comprising:

wherein the rendering step of rendering a selected object and a 3D scene into off screen image and depth buffers further comprises:

rendering all objects in the scene except for the selected object into the depth buffers and discarding any color information.

16. The tangible computer storage medium of claim 13 having a set of computer-readable instructions that, when executed, perform acts further comprising:

wherein the rendering step of rendering a selected object and a 3D scene into off screen image and depth buffers further comprises:

rendering the selected object into the depth and the image buffers preserving both color and depth information and generating said texture image containing an image of a set of visible parts of the selected object over a background color.

17. The tangible computer storage medium of claim 13 having a set of computer-readable instructions that, when executed, perform acts further comprising:

wherein the adding step of adding a screen-aligned transparent quad object to the 3D scene and rendering the quad by drawing a silhouette highlight of the selected object comprises:

adding a screen aligned transparent quad object to the 3D scene that is perpendicular to a view direction and is positioned in front of all objects on the scene covering the whole screen.

18. The tangible computer storage medium of claim 17 having a set of computer-readable instructions that, when executed, perform acts further comprising, wherein the adding step of adding a screen-aligned transparent quad object to the 3D scene and rendering the quad by drawing a silhouette highlight of the selected object further comprises:

drawing a silhouette of the selected object in response to said texture image containing an image of a set of visible parts of the selected object over a background color.

* * * * *